(12) United States Patent
Kawakami et al.

(10) Patent No.: US 7,899,617 B2
(45) Date of Patent: Mar. 1, 2011

(54) NAVIGATION SYSTEM PROVIDING ROUTE GUIDANCE IN MULTI-LANE ROAD ACCORDING TO VEHICLE LANE POSITION

(75) Inventors: Hidehiko Kawakami, Nagoya (JP); Michima Ogawa, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 1147 days.

(21) Appl. No.: 11/355,011

(22) Filed: Feb. 16, 2006

(65) Prior Publication Data

US 2006/0184321 A1 Aug. 17, 2006

(30) Foreign Application Priority Data

Feb. 17, 2005 (JP) .................................. 2005-040663
Feb. 17, 2005 (JP) .................................. 2005-040664

(51) Int. Cl.
*G01C 21/30* (2006.01)
(52) U.S. Cl. .......................................... 701/210; 701/202
(58) Field of Classification Search .................... 701/210
See application file for complete search history.

(56) References Cited

U.S. PATENT DOCUMENTS

| | | | | |
|---|---|---|---|---|
| 2,933,716 | A * | 4/1960 | Soderberg | 340/934 |
| 5,757,289 | A * | 5/1998 | Nimura et al. | 340/995.21 |
| 5,931,888 | A * | 8/1999 | Hiyokawa | 701/208 |
| 6,064,941 | A * | 5/2000 | Nimura et al. | 701/210 |
| 6,101,443 | A * | 8/2000 | Kato et al. | 701/210 |
| 6,295,503 | B1 * | 9/2001 | Inoue et al. | 701/209 |
| 6,466,867 | B1 * | 10/2002 | Sakashita | 701/211 |
| 6,560,532 | B2 * | 5/2003 | Cayford | 701/209 |
| 6,637,343 | B2 * | 10/2003 | Stephan et al. | 104/295 |
| 6,728,634 | B2 * | 4/2004 | Monde et al. | 701/209 |
| 6,804,604 | B2 * | 10/2004 | Yamazaki | 701/211 |
| 7,103,475 | B2 * | 9/2006 | Irie | 701/211 |
| 7,319,931 | B2 * | 1/2008 | Uyeki et al. | 701/209 |
| 7,376,508 | B2 * | 5/2008 | Barkowski et al. | 701/208 |
| 7,395,153 | B1 * | 7/2008 | Nesbitt et al. | 701/210 |

(Continued)

FOREIGN PATENT DOCUMENTS

JP A-8-110236 4/1996

(Continued)

OTHER PUBLICATIONS

Office Action dated Mar. 21, 2008 in corresponding Chinese Patent Application No. 200610008552.2 (and English translation).

(Continued)

*Primary Examiner* — Thomas G Black
*Assistant Examiner* — Sze-Hon Kong
(74) *Attorney, Agent, or Firm* — Posz Law Group, PLC

(57) ABSTRACT

A navigation system for a vehicle determines a recommended route to a destination among a plurality of possible routes to the destination based on total profile values of the plurality of possible routes. The navigation system guides the vehicle to the destination along the recommended route. Here, navigation system determines whether an upstream side section of one of the plurality of possible routes is located on a multi-lane road in a specific condition. The navigation system determines whether an exit road and an entrance road are connected to the multi-lane road on a common side of the multi-lane road. The navigation system sets an amount of increase to be reflected into the total profile value of the one of the plurality of possible routes based on determination results.

5 Claims, 11 Drawing Sheets

U.S. PATENT DOCUMENTS

| | | | |
|---|---|---|---|
| 2002/0077747 A1* | 6/2002 | Hijikata | 701/209 |
| 2003/0023369 A1* | 1/2003 | Takashima | 701/208 |
| 2003/0033080 A1* | 2/2003 | Monde et al. | 701/201 |
| 2003/0033083 A1* | 2/2003 | Nakashima et al. | 701/211 |
| 2004/0184879 A1* | 9/2004 | Winkler | 404/1 |
| 2005/0073434 A1* | 4/2005 | Arquette et al. | 340/907 |
| 2005/0114020 A1* | 5/2005 | Seto et al. | 701/211 |
| 2005/0171694 A1* | 8/2005 | Schirmer et al. | 701/211 |
| 2007/0106470 A1* | 5/2007 | Nakayama et al. | 701/211 |
| 2009/0093954 A1* | 4/2009 | Seto | 701/201 |

FOREIGN PATENT DOCUMENTS

| | | |
|---|---|---|
| JP | A-2000-18956 | 1/2000 |
| JP | A-2000-266559 | 9/2000 |
| JP | A-2000-337896 | 12/2000 |
| JP | A-2001-330459 | 11/2001 |
| JP | A-2002-250635 | 9/2002 |
| JP | A-2003-240587 | 8/2003 |
| JP | A-2003-329468 | 11/2003 |
| JP | A-2004-061356 | 2/2004 |

OTHER PUBLICATIONS

Office Action dated Apr. 6, 2010 from Japan Patent Office in corresponding Japanese Patent Application No. 2005-040664 (and English translation).

* cited by examiner

INTERCHANGE

NAVIGATION SYSTEM PROVIDING ROUTE GUIDANCE IN MULTI-LANE ROAD ACCORDING TO VEHICLE LANE POSITION

CROSS REFERENCE TO RELATED APPLICATION

This application is based on and incorporates herein by reference Japanese Patent Applications No. 2005-40663 filed on Feb. 17, 2005 and No. 2005-40664 filed on Feb. 17, 2005.

BACKGROUND OF THE INVENTION

1. Field of the Invention

The present invention relates to a navigation system and a program thereof, which calculates a total cost (a total profile value) for each of plurality of possible routes to a destination and determines a recommended route such that the recommended route has the smallest cost among the possible routes. The navigation system and the program thereof also guide a driver of a vehicle to the recommended route. The present invention also relates to a navigation system and a program thereof for guiding a vehicle to recommended lanes on a road (i.e., lane navigation).

2. Description of Related Art

Conventionally, a navigation system, which calculates a total cost (a total profile value) for each of plurality of possible routes to a destination and determines a recommended route such that the recommended route has the smallest cost among the possible routes, has been proposed. The navigation system also guides a vehicle to the recommended route. The navigation system calculates the total cost of each of possible routes by summing a cost part of each link corresponding to a road section located on the route. The cost part of each link in the route depends on various factors, such as a length, a width and a type of the corresponding road section of the link. Also, the cost part of each link varies when the corresponding road section of the link is located immediately after another road section in the route, which turns in a right or left direction. For example, the cost of one route becomes higher at the time a traffic jam occurs on a road corresponding to a certain link of the route than at the time the traffic jam does not occur.

However, the above-described conventional navigation system has the following disadvantages. FIG. 1 is a top view showing a road configuration, which includes a highway main road 41. The road configuration includes the highway main road 41, an entrance road (an entrance ramp) 42, an exit road (an exit ramp) 43, an exit road (an exit ramp) 44, a road 45. The highway main road 41 includes two lanes going one way. The entrance road 42 merges with the highway main road 41 at a merge point on a right side thereof. The exit road 43 branches from the highway main road 41 on the right side thereof at an upstream side of the merge point, where the entrance road 42 merges into the highway main road 41. The exit road 44 branches from the highway main road 41 on the right side thereof at a branch point located on a downstream side of the merge point. The exit road 43 and the exit road 44 merge together to form the road 45.

Under the above-described road configuration, we discuss the navigation system to calculate a recommended route to a facility located on a downstream side of the road 45 for a vehicle, which drives in a right direction on the highway main road 41 coming from a left end in FIG. 1. Usually, the navigation system calculates the cost in such a manner that the cost of one route that travels along a branch road, such as an exit road, becomes larger than the cost of the other route that travels along a main road. As a result, the navigator system determines a route 46, which travels along the highway main road 41, as the recommended route because of its small cost. As a result, a route 47, which travels along the exit road 43, is not determined as the recommended route.

The route 46 on the highway main road 41 is led to the exit road 44 from one side of the highway main road 41 after the entrance road 42 is merged into the highway main road 41 on the common side thereof. Therefore, in some cases, a vehicle that drives on the highway main road 41 may suffer from crossing another vehicle path that approaches the highway main road 41 through a route 60 shown by an arrow. As a result, in the case, where a distance between a branch point 49 and a merge point 50 is shorter, a driver of the vehicle on the main road does not calmly deal with the other vehicle that cuts in the main road 41. Therefore, psychological stress for the driver becomes larger. Here, the branch point 49 is located at a point where the exit road 44 branches from the highway main road 41. The merge point 50 is located at a point where the entrance road 42 is merged into the highway main road 41. As a result, a driving along the route 47 to the destination may be more preferable than a driving along the route 46 in some cases.

Also, in a case where the exit road 43 did not exist, a driving along a route 48, which travels along the highway main road 41, might be more preferable when the risk of a collision with the other vehicle at the merge point 50 is taken into consideration. When driving along the route 48, the vehicle passes by the branch point 49 and drives along the highway main road 41 in order to exit the main road 41 through another safe exit road located on a downstream side of the branch point 49.

The present invention also relates to a navigation system and a program thereof for guiding a vehicle to recommended lanes on a road (i.e., lane navigation).

Conventionally, Japanese Unexamined Patent Publication No. 2000-266556 corresponding to U.S. Pat. No. 6,466,867 and Japanese Unexamined Patent Publication No. 2000-18956 have disclosed navigation systems, which guide a recommended lane by use of an enlarged map and a voice for a navigation point, when a road to the navigation point has multiple lanes. The navigation systems may guide the recommended lane by voices, which go like "turn right at X meters ahead, so change the lane to the right lane". Here, the navigation point includes an intersection along a recommended route to a destination.

However, for example, after this lane navigation is performed, the vehicle may have difficulties in changing lanes to the recommended lane to follow the recommended route, when the vehicle is going to enter the navigation point, which is a target of the lane navigation. This is because the vehicle may be still driving on a lane located away from the recommended lane that the lane navigation recommends, and also because the recommended lane may be filled with other vehicles. It is desirable to avoid changing lanes at such an unreasonable state, when a safety of the vehicle is taken into consideration.

SUMMARY OF THE INVENTION

It is therefore an object of the present invention to provide a navigation system and a program thereof, which obviate or mitigate at least one of the above disadvantages.

To achieve the objective of the present invention, there is provided a navigation system for a vehicle, which determines a recommended route to a destination among a plurality of possible routes to the destination based on total profile values of the plurality of possible routes in such a manner that the recommended route is chosen to have a minimum one of the total profile values among the plurality of possible routes. The navigation system guides the vehicle to the destination along the recommended route determined by the navigation system. The navigation system determines whether an upstream side section of one of the plurality of possible routes, which is present on an upstream side of a predetermined road section of a multi-lane road defined between a merge point of the multi-lane road and a branch point of the multi-lane road along the one of the plurality of possible routes, is located on the multi-lane road, wherein the branch point of the multi-lane road is directly connected to an exit road for exiting the multi-lane road along the one of the plurality of possible routes, and the merge point is directly connected to an entrance road for entering the multi-lane road. The navigation system determines whether the exit road and the entrance road are connected to the multi-lane road on a common side of the multi-lane road. The navigation system sets an amount of increase to be reflected into the total profile value of the one of the plurality of possible routes, wherein in a case where a determination result of the upstream side section and a determination result of the connection side are both affirmative, the navigation system sets the amount of increase to be higher than that of a case where at least one of the determination result of the upstream side section and the determination result of the connection side is negative.

To achieve the objective of the present invention, there is provided a computer program embodied in a computer readable medium, which includes a route calculating code segment and a route guiding code segment. The route calculating code segment includes an upstream side section determining code segment, a connection side determining code segment and a profile value increase setting code segment. The route calculating code segment determines a recommended route of a vehicle to a destination among a plurality of possible routes to the destination based on total profile values of the plurality of possible routes in such a manner that the recommended route is chosen to have a minimum one of the total profile values among the plurality of possible routes. The route guiding code segment guides the vehicle to the destination along the recommended route determined by the route calculating code segment. The upstream side section determining code segment determines whether an upstream side section of one of the plurality of possible routes, which is present on an upstream side of a predetermined road section of a multi-lane road defined between a merge point of the multi-lane road and a branch point of the multi-lane road along the one of the plurality of possible routes, is located on the multi-lane road, wherein the branch point of the multi-lane road is directly connected to an exit road for exiting the multi-lane road along the one of the plurality of possible routes, and the merge point is directly connected to an entrance road for entering the multi-lane road. The connection side determining code segment determines whether the exit road and the entrance road are connected to the multi-lane road on a common side of the multi-lane road. The profile value increase setting code segment sets an amount of increase to be reflected into the total profile value of the one of the plurality of possible routes, wherein in a case where a determination result of the upstream side section determining code segment and a determination result of the connection side determining code segment are both affirmative, the profile value increase setting code segment sets the amount of increase to be higher than that of a case where at least one of the determination result of the upstream side section determining code segment and the determination result of the connection side determining code segment is negative.

To achieve the objective of the present invention, there is provided a navigation system for a vehicle, which determines a recommended route to a destination among a plurality of possible routes to the destination based on total profile values of the plurality of possible routes in such a manner that the recommended route is chosen to have a minimum one of the total profile values among the plurality of possible routes. The navigation system guides the vehicle to the destination along the recommended route determined by the navigation system. The storage medium of the navigation system stores profile value increase data, which indicates an amount of increase to be reflected into the total profile value of one of the plurality of possible routes in a case where the one of the plurality of possible routes includes a predetermined road section of a multi-lane road defined between a merge point of the multi-lane road and a branch point of the multi-lane road. The merge point of the multi-lane road is directly connected to an entrance road for entering the multi-lane road. The branch point of the multi-lane road is directly connected to an exit road for exiting the multi-lane road along the one of the plurality of possible routes on a common side of the multi-lane road where the entrance road is connected to the multi-lane road. The amount of increase is set in such a manner that in a case where an upstream side section of the one of the plurality of possible routes, which is present on an upstream side of the predetermined road section of the multi-lane road, is located on the multi-lane road, the amount of increase is higher than that of a case where the upstream side section of the one of the plurality of possible routes is located on the entrance road. The navigation system determines whether the upstream side section of the one of the plurality of possible routes is present on the multi-lane road. The navigation system sets the amount of increase to be reflected into the total profile value of the one of the plurality of possible routes based on a determination result of the upstream side section in view of the profile value increase data stored in the storage medium.

To achieve the objective of the present invention, there is provided a navigation system for a vehicle, which guides the vehicle to a first recommended route lane of a multi-lane road based on a first recommended route to a destination at a first spot located along the multi-lane road on an upstream side of a junction area of the multi-lane road, which includes at least one branch point for branching from the multi-lane road, wherein the first recommended route travels along the multi-lane road and exits the multi-lane road along a first branch road, which branches from the multi-lane road at a first one of the at least one branch point in the junction area. The navigation system determines whether a current lane, on which the vehicle drives, is the first recommended route lane at a second spot located along the multi-lane road between the first spot and the junction area. The navigation system guides the vehicle to a second recommended route lane of the multi-lane road based on a second recommended route to the destination when the navigation system determines that the current lane is not the first recommended route lane.

To achieve the objective of the present invention, there is provided a program embodied in a computer readable medium, which includes a first recommended route lane navigating code segment, a lane determining code segment and a second recommended route lane navigating code segment. The first recommended route lane navigating code segment guides a vehicle to a first recommended route lane of a multi-lane road based on a first recommended route to a destination at a first spot located along the multi-lane road on an upstream side of a junction area of the multi-lane road, which includes at least one branch point for branching from the multi-lane road, wherein the first recommended route travels along the multi-lane road and exits the multi-lane road along a first branch road, which branches from the multi-lane road at a first one of the at least one branch point in the junction area. The lane determining code segment determines whether a current lane, on which the vehicle drives, is the first recommended route lane at a second spot located along the multi-lane road between the first spot and the junction area. The second recommended route lane navigating code segment guides the vehicle to a second recommended route lane of the multi-lane road based on a second recommended route to the destination when the lane determining code segment determines that the current lane is not on the first recommended route lane.

To achieve the objective of the present invention, there is provided map data of a navigation system embodied in a computer readable medium, which includes a first spot. The first spot is located along a multi-lane road on an upstream side of a junction area of the multi-lane road, which includes at least one node connected with first and second links for branching from the multi-lane road, wherein the first spot is a point, at which the navigation system starts guiding of a vehicle to a first recommended route lane of the multi-lane road based on a first recommended route. The first and second links satisfy one of the followings two cases. In one case, the at least one node includes a single node, wherein an upstream end of the first link and an upstream end of the second link are commonly connected with the single node, and a downstream end of the first link and a downstream end of the second link are connected with a node, which is located along the first recommended route on a downstream side of the single node. In another case, the at least one node includes first and second nodes, wherein the upstream end of the first link is connected with the first node, the upstream end of the second link is connected with the second node, and the downstream end of the first link and the downstream end of the second link are connected with the node, which is located along the first recommended route on a downstream side of the first node.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 2:
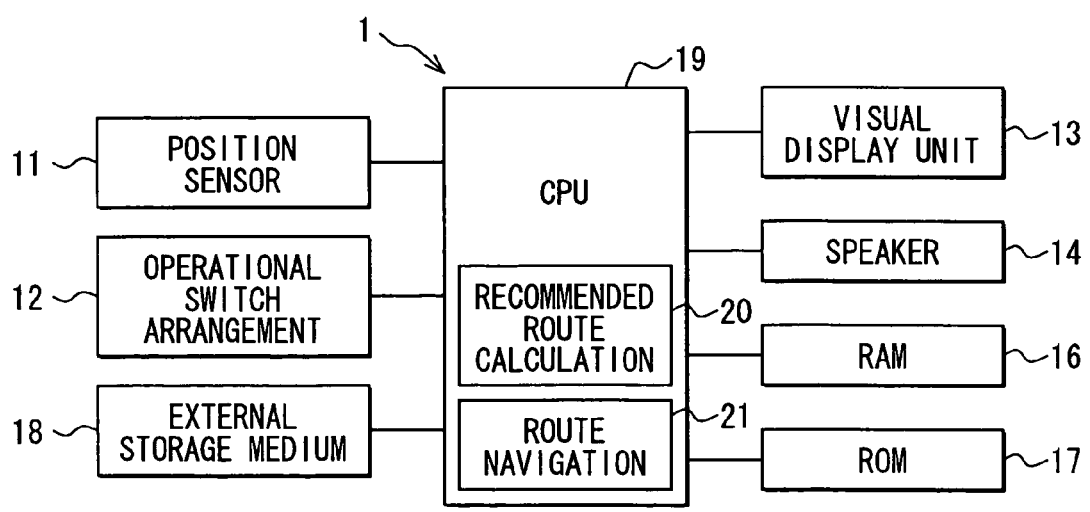
FIG. 2 is a hardware structure diagram of a navigation system according to a first embodiment of the present invention.
Figure 3A:
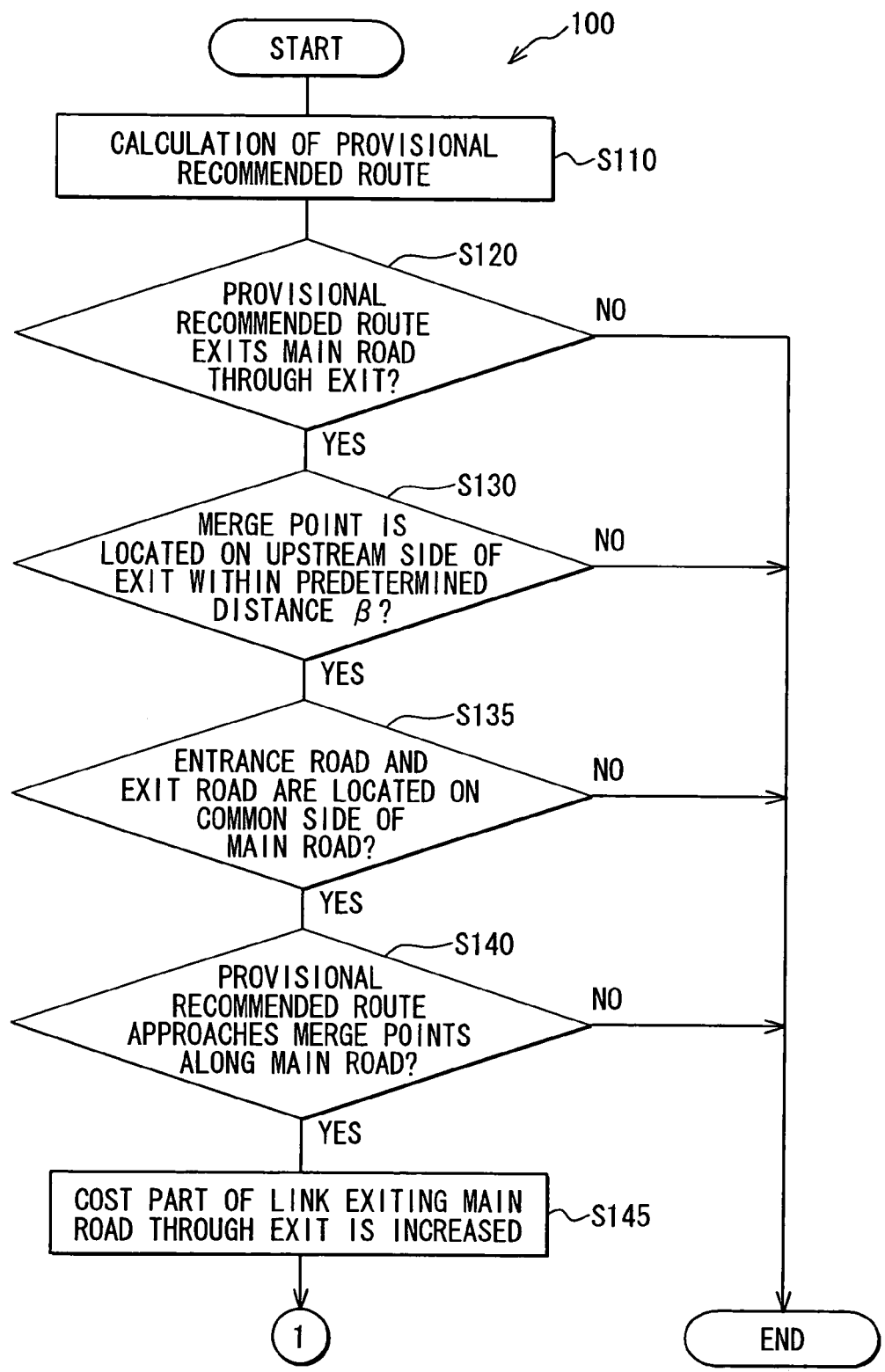
FIG. 3A is a flow chart of a program, which is executed by a central processing unit (CPU)
Figure 3B:
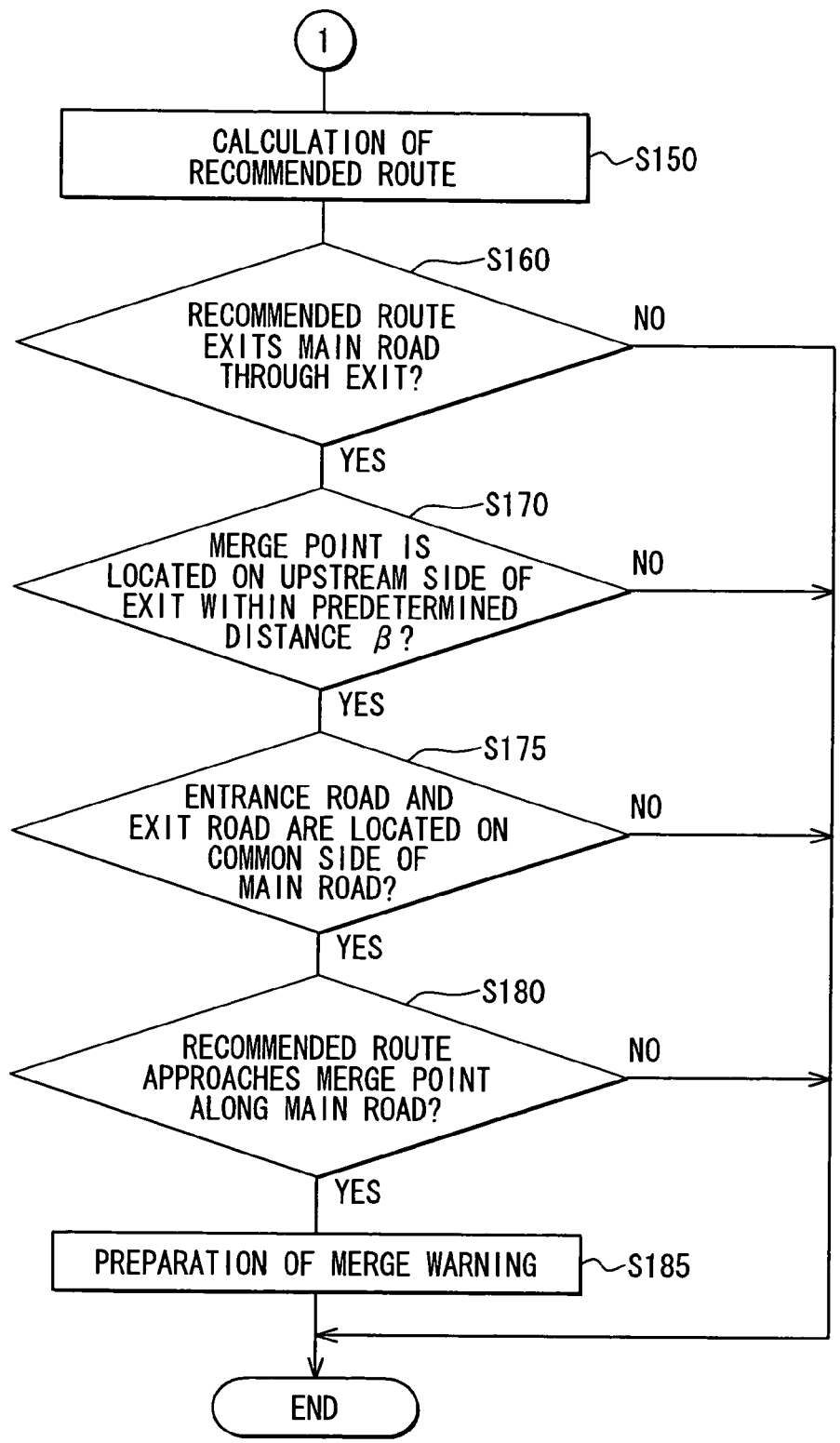
FIG. 3B is a continued flow chart of the program, which is executed by the CPU.

A first embodiment of the present invention will be described below. FIG. 2 is a hardware structure diagram of a navigation system 1 according to the first embodiment of the present invention. The navigation system 1 for a vehicle includes a position sensor 11, an operational switch arrangement 12, a visual display unit 13, a speaker 14, a random-access memory (RAM) 16, a read-only memory (ROM) 17, an external storage medium 18 and a central processing unit (CPU) 19.

The position sensor 11 includes a magnetic field sensor, a gyroscope, speed sensor, a steering angle sensor and a global positioning system (GPS) receiver (all of these are well-known and are not illustrated). The position sensor 11 outputs information to the CPU 19. The information is based on signals of these sensors and is used to detect a current position and direction of the vehicle.

The operational switch arrangement 12 includes input devices, such as multiple mechanical switches mounted on the navigation system 1 for the vehicle and a touch panel mounted over a display of the visual display unit 13. The operational switch arrangement 12 outputs signals to the CPU 19, the signals based on user's actions, such as pushing down the mechanical switches and touching the touch panel.

The visual display unit 13 displays images based on image signals outputted by the CPU 19. The displayed images include, for example, a map that has a current position of the vehicle at its center.

The external storage medium 18 is a nonvolatile storage medium, such as a hard disk drive (HDD) and stores programs, which the CPU 19 reads and executes, and map data for a route navigation.

The map data includes facility data and road data, which have positions and types of links and nodes, lane information, connection relationship information among the links and the nodes. The connection relationship information teaches which link is connected to which node, and also teaches extending directions of links in relation to a node that is connected to each of the links. The lane information includes a number of lanes included in a corresponding link, a width of each lane, a position of each lane and a connection relationship of each lane with other links.

The CPU 19, which corresponds to a computer, reads programs for an operation of the navigation system 1 from the ROM 17 and the external storage medium 18. When executing the programs, the CPU 19 reads information from the RAM 16, ROM 17 and the external storage medium 18 and writes information in the RAM 16 and the external storage medium 18 to exchange signals with the position sensor 11, the operational switch arrangement 12, the visual display unit 13 and the speaker 14.

Specifically, the CPU 19 performs a current position identifying process, a recommended route calculation process 20 and a route navigation process 21 by executing the programs.

The current position identifying process identifies a current position and direction of the vehicle based on the signals from the position sensor 11 by use of a well-known technology, such as a map mapping.

The recommended route calculation process 20 determines a most preferable recommended route from the current position to the destination. The recommended route calculation process 20 is started when input signals from the user are received through the operational switch arrangement 12 or is also started when the vehicle deviates from the recommended route that the route navigation process 21 recommends.

The route navigation process 21 reads the map data from the external storage medium 18 and superimposes calculated data on the map, which is indicated by the map data. Here, the calculated data include the recommended route, a target facility, facilities on the way to the target facility and the current position. Then, the route navigation process 21 outputs the map image, which is superimposed with the calculate data, to the visual display unit 13. In a particular situation, such as when the vehicle reaches to a position that is located on an upstream side of a navigation intersection by a predetermined distance separation, a voice guidance signal for instruction, such as a right turn, a left turn or a lane change, is outputted to the speaker 14. In the route navigation process 21, the CPU 19 performs various navigations (e.g., guidance or instruction) based on predetermined navigation data, which are generated during the recommended route calculation process 20. The navigation data describes specifications of navigation (image or voice) and output methods (the visual display unit 13 or the speaker 14).

FIGS. 3A to 4B show flow charts of programs 100 and 200, which are executed by the CPU 19 for performing the recommended route calculation process 20 and the like. The program 100 is executed by the CPU 19 when the CPU 19 receives destination data inputted by the user through the operational switch arrangement 12. The program 200 is repeatedly operated by the CPU 19 while the route navigation process 21 is executed.

Operations of the CPU 19, which executes the programs 100 and 200, will be described with reference to a road configuration shown in FIG. 1. In the road configuration shown in FIG. 1, an exit road (an exit ramp) 43 branches from a highway main road (multi-lane road) 41, which has two lanes going one way, from a left side of the highway main road 41. An entrance road 42 is merged into the highway main road 41 at a merge point 50, which is located on the downstream side of the branch, and an exit road (an exit ramp) 44 branches from the highway main road 41 at a branch point 49. Here, the merge point 50 is separated by a distance γ from the branch point 49 along the highway main road 41. Then, the exit road 43 is inevitably merged into the exit road 44 and the merged road is connected to a road 45.

In execution of the program 100, the CPU 19 calculates a provisional recommended route from a current position of the vehicle to the destination at step S110. The provisional recommended route is calculated as follows. Firstly, a cost (a total profile value) of each of multiple possible routes from the current position to the destination will be calculated. Then, a route with a smallest cost is selected among the possible routes to serve as the provisional recommended route. There are several methods to calculate the recommended route by use of the cost, such as a Dijkstra method and a genetic algorithm. The cost of a certain route is calculated as follows. For example, firstly a cost part of each link that constitutes each route will be calculated and then, the cost parts will be summed up to make a total value of the cost parts of the links included in the route. Then, the total value is defined to serve as the cost (total profile value) of the route. The cost part of the link depends on conditions, such as a length and a type (e.g., a highway, a major road) of the link. Also the cost part of the link changes if a traffic jam exists. Further, the cost part of the link depends on the location of the link (e.g., the link may be located on a downstream side of a junction, where the vehicle turns).

At step S120, the CPU 19 determines if the provisional recommended route calculated at step S110 includes a route that exits the main road through an exit based on the map data. Here, the main road means a major road that includes multiple lanes going one way between cities, such as a highway road and a toll road. Also, the exiting the main road through the exit means exiting the main road at a branch point, at which an exit ramp (an exit road) branches from the main road. Here, the exit indicates the branch point between the main road and the exit road. For example, in FIG. 1, the route that exits the main road through the exit is a route that travels through the highway main road 41 and enters the exit road 44. If the provisional recommended route includes the route that exits the main road through the exit, the CPU 19 executes step S130. If not, the provisional recommended route is defined as a recommended route and the program 100 is ended.

At step S130, the CPU 19 determines if the provisional recommended route includes a merge point located on an upstream side of the exit identified at step S120 within a predetermined distance β from the exit. Here, the merge point means a point, at which an entrance ramp (an entrance road) is merged into the main road. The predetermined distance β is a distance (e.g., 500 m), which can allow a driver of the vehicle to calmly change lanes so that the vehicle exits the main road along the exit road even when another vehicle enters the main road along the entrance road. The predetermined distance β may be defined as a value between a first predetermined distance (e.g., 500 m) and a second predetermined distance (e.g., 700 m). Also, if there is no other merge points or other branch points between the exit identified at step S120 and the merge point, the distance between the exit and the merge point may be defined as the predetermined distance β. In FIG. 1, the merge point 50 is located on the upstream side of the exit (i.e., the branch point 49) by a distance γ (γ<β) therefrom. As a result, the determination result is YES (affirmation). When the determination result is YES, step S135 is executed, and when the determination result is NO, the provisional recommended route is defined as the recommended route and then the program 100 is ended.

At step S135, it is determined if the entrance road and the exit road are connected to the main road on a common side thereof. Specifically, it is identified which side (right or left in a driving direction) of the main road each of the entrance road and the exit road is connected to. When both of the entrance road and the exit road are connected to the main road on a right side thereof, and also when both are connected to the main road on a left side thereof, it is determined that both the entrance road and the exit road are connected to the main road on the common side thereof. The identification of the above-described connection state of the entrance and exit roads to the main road is made based on connection relationship information between the links and nodes in the map data. Identification of the connection state of the entrance road at the merge point will be described. For example, each of three links that connect to the node at the merge point is checked to see a extending direction thereof from the node at the merge point based on the connection relationship information, and then it is identified a side of the road (e.g., the main road) in the driving direction the target road (e.g., the entrance road or the exit road) is connected to based on the above-checked extending directions. Here, the three links include a link (a main road approaching link) corresponding to the main road, which enters the node along the provisional recommended route, a link (a main road departing link) corresponding to the main road, which departs the node along the provisional recommended route, and a link (an entrance road link) corresponding to the entrance road. As a result, it is identified that in FIG. 1, for instance, the entrance road 42 and the exit road 44 are both connected to the highway main road 41 on the right side thereof in the driving direction.

If the both roads 42 and 44 are connected to the highway main road 41 on the common side thereof, step S140 is executed. If not, the provisional recommended route is defined as the recommended route and then, the program 100 is ended.

At step S140, it is determined if the provisional recommended route approaches the merge point along the main road. If the provisional recommended route does not approach the merge point along the main road, this means that the provisional recommended route approaches the merge point along the entrance road. In FIG. 1, for instance, the route 46 approaches the merge point 50 along the main road 41, and a route 60 depicted as an arrow approaches the merge point 50 along the entrance road 42. If the provisional recommended route approaches the merge point along the main road, step S145 is executed. If not, the provisional recommended route is defined as the recommended route and then, the program 100 is ended.

At step S145, a cost part of a link that corresponds to a road exiting the main road through the exit (i.e., a cost part of a link corresponding to the exit road) is increased to be larger by a positive number a than a previously calculated cost part of the link at step S110 in calculation of the provisional recommended route.

At step S150, the recommended from the current position to the destination is determined by recalculating a cost of each of the multiple possible routes based on the increased cost part for the link corresponding to the exit road. As a result, the route traveling along the exit road tends not to be determined as the recommended route, because the cost of the route traveling along the exit road is increased by the positive number a compared with the cost previously calculated at step S110.

At step S160, similarly to step S120, it is determined if the recommended route calculated at step S150 includes a route that exits the main road through the exit. If the recommended route includes the route exiting the main road through the exit, step S170 is executed. If not, the program 100 is ended.

At step S170, similarly to step S130, it is determined if the recommended route includes the merge point located on an upstream side of the exit identified at step S160 and is located within the predetermined distance β from the exit. If the determination result of step S170 is YES (affirmative), step S175 is executed. If the determination result is NO (negative), the program 100 is ended.

At step S175, similarly to step S135, it is determined if the entrance road and the exit road are connected to the main road on the common side of the main road. If the both roads are connected to the main road on the common side thereof, step S180 is executed. If not, the program 100 is ended.

At step S180, similarly to step S140, it is determined if the recommended route approaches the merge point along the main road. If the recommended route approaches the merge point along the main road, step S185 is executed. If not, the program 100 is ended.

At step S185, a merge warning preparation is performed. Specifically, in the merge warning preparation, guidance data is generated so that a warning signal for a risk of collision with another vehicle coming along the entrance road will be outputted as text data or voice data to the visual display unit 13 or the speaker 14 based on the guidance data when the vehicle approaches the merge point identified at step S170. The warning signal includes voice guidance, which goes like "the merge lane ahead, so watch out."

The CPU 19 executes the above-described program 100 so that the navigation system 1 calculates the provisional recommended route to the destination that the user sets (see step S110). Then, the navigation system 1 determines (1) if the provisional recommended route includes a route that exits the main road along the exit road (see step S120), (2) if the provisional recommended route includes the entrance road that is merged into the main road at the merge point located on the upstream side of the exit and is located within the predetermined distance β from the exit (see step S130), (3) it is determined if the entrance road and the exit road are connected to the main road on the common side thereof (see step S135) and (4) if the provisional recommended road approaches the merge point along the main road (see step S140). If all of the four determination results are YES (affirmative), the cost part of the link corresponding to the exit road that exits the main road becomes an increased cost part calculated by adding the positive number a to the normal cost part used in step S110 (see step S145). The cost of each of the multiple possible routes to the destination is recalculated based on the increased cost part of the link so that the recommended route is determined (see step S150).

Here, a state that satisfies the above-described conditions (1) to (4) means that a route X includes a predetermined road section of a multi-lane road defined between a merge point of the multi-lane road and a branch point of the multi-lane road, wherein the merge point of the multi-lane road is directly connected to an entrance road for entering the multi-lane road, the branch point of the multi-lane road is directly connected to an exit road for exiting the multi-lane road along the route X on a common side of the multi-lane road where the entrance road is connected to the multi-lane road. If the above described conditions are not satisfied (i.e., at least one of the above-described conditions (1) to (4) is not satisfied), the cost part of the link will not be increased and the cost for each of the multiple possible routes will not be recalculated to determine another recommended route. Therefore, an amount of increase to be reflected into the total cost of the route X due to the exit road exiting the multi-lane road, is larger in a case, where the above-described conditions (1) to (4) are satisfied, than that in another case, where the at least one of the conditions (1) to (4) is not satisfied. In other words, the cost part of the link corresponding to the exit road in a case, where the above-described conditions (1) to (4) are satisfied, may be a variable p. The cost part of the link corresponding to the exit road in a case, where the at least one of the conditions (1) to (4) is not satisfied, may be a variable q. Here, the variable p is larger than the variable q, which may be equal to zero in some cases.

Figure 1:
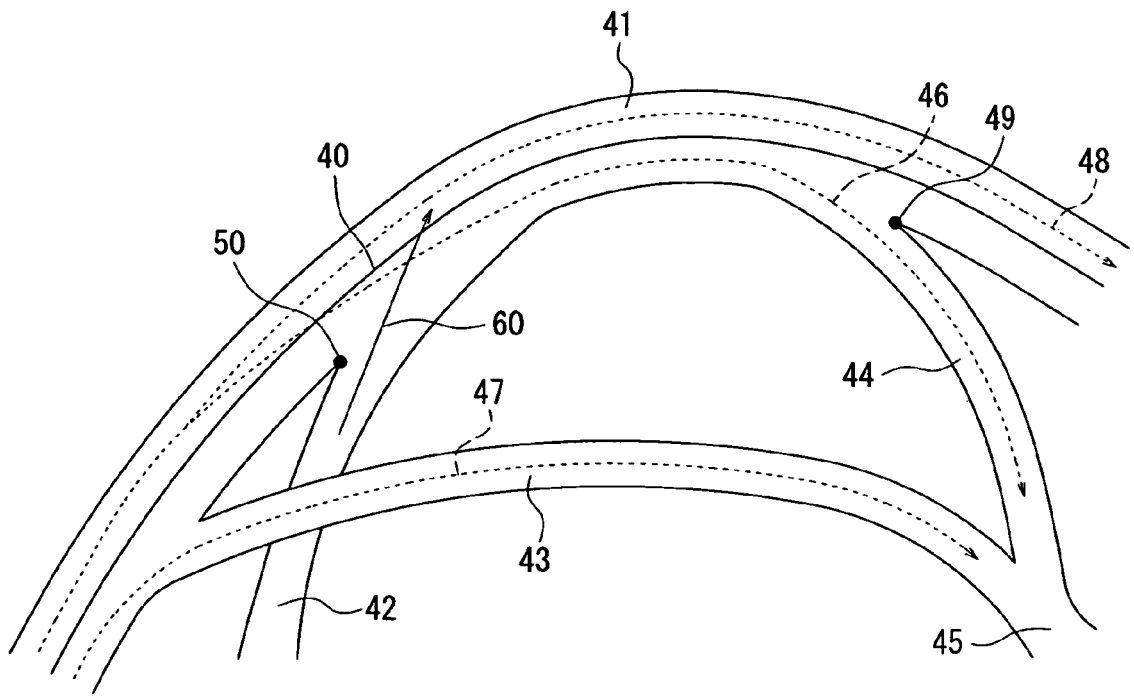
FIG. 1 is a top view showing a road configuration, which includes a highway main road.

Due to the above-described operation, in the road configuration as shown in FIG. 1 with a road section of a highway main road (multi-lane road) 41 defined between a merge point 50 of the highway main road 41 and a branch point 49 of the highway main road 41, wherein merge point 50 of the highway main road 41 is directly connected to the entrance road 42 for entering the highway main road 41, the branch point 49 of the highway main road 41 is directly connected to the exit road 44 for exiting the highway main road 41 along the recommended route on a common side of the highway main road 41 where the entrance road 42 is connected to the highway main road 41, an increase amount of a cost of a route (A) due to the exiting the main road along the exit road is calculated to be larger than the increase amount of a cost of a route (B). As a result, the risk of the collision with other vehicles, which drive into the highway main road 41 along the entrance road 42, can be taken into consideration. Here, the highway main road 41 includes the multiple lanes. Here, the route (A) travels along the highway main road 41 to merge with the entrance road 42, and then the route (A) exits the main road 41 along the exit road 44. The route (B) travels along the entrance road 42 to merge with the highway main road 41, and then the route (B) exits the main road 41 along the exit road 44. Therefore, in FIG. 1, the navigation system 1 may tend to select the route 47 or the route 48 instead of selecting the route 46 in a case, where the vehicle is coming from an upstream side of the highway main road 41 shown in a lower left part in FIG. 1 to the facility located on a downstream side of the road 45. Here, the route 47 approaches the road 45 along the exit road 43. The route 48 remains on the highway main road 41 traveling along the merge point 50 and the branch point 49 instead of exiting the highway main road 41. The route 46 enters the road 45 after traveling through the merge point 50 and the branch point 49.

When the recalculated recommended route still satisfies all of the above-described conditions (1) to (4) (see steps S160 to S180), the merge warning navigation for the driver of the vehicle, which is approaching the merge point, will be prepared (see step S185) instead of recalculating the another recommended route.

Therefore, it is possible to draw attention of the driver by warning of the merger even in a case, where the route 46 that travels along the exit road 44 becomes the recommended route after the above-described recalculation of the recommended route is performed.

Figure 4A:
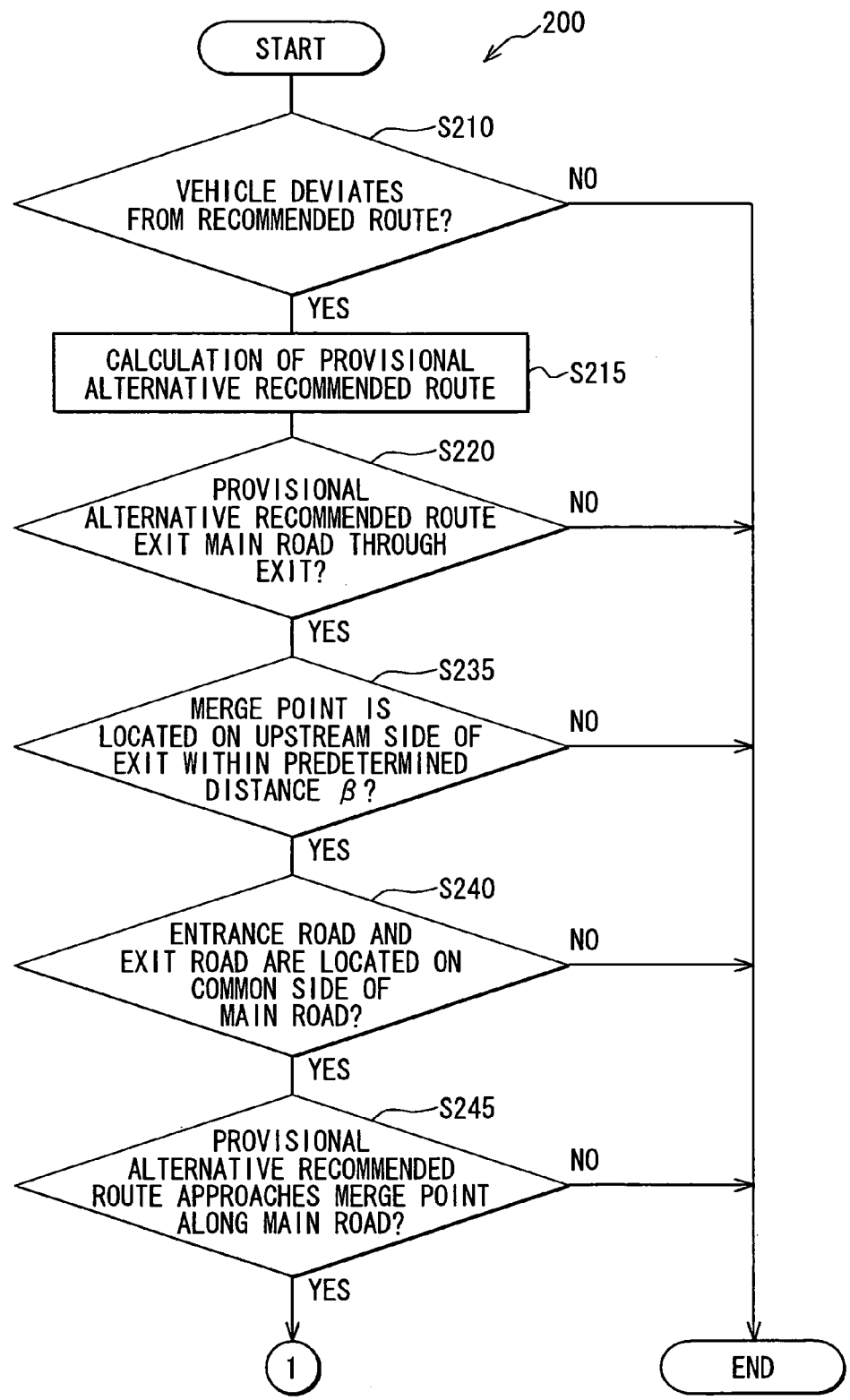
FIG. 4A is a flow chart of a program, which is executed by the CPU.
Figure 4B:
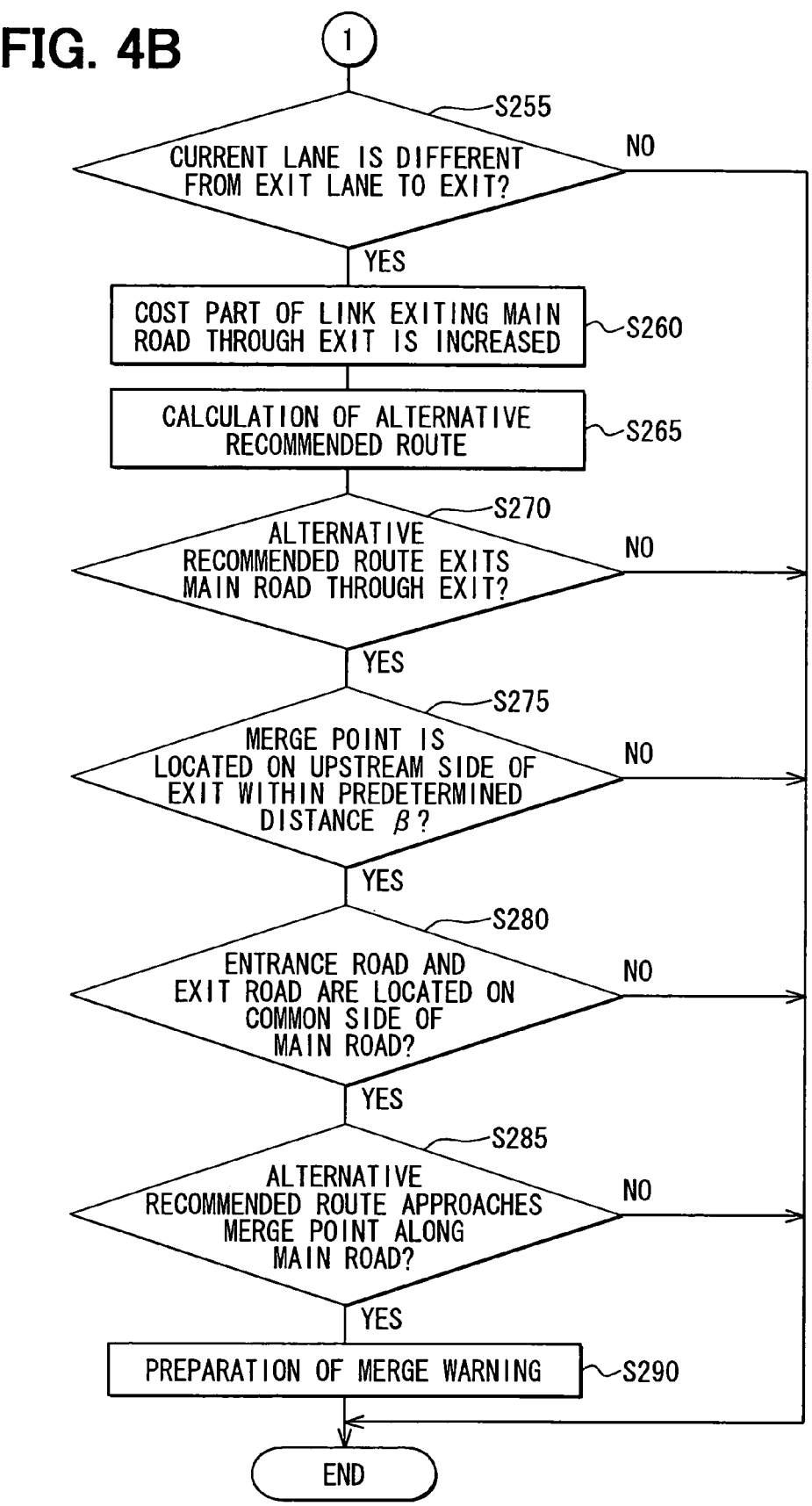
FIG. 4B is a continued flow chart of the program, which is executed by the CPU.

The program 200 for calculating an alternative recommended route when the vehicle deviates from the recommended route will be described with reference to FIGS. 4A and 4B. It is determined if the vehicle deviates from the current recommended route based on a gap between the current position of the vehicle identified by the current position identifying process and the recommended route. If it is determined that the vehicle deviates from the recommended road, step S215 is executed. If not, the program 200 is ended.

In step S215, a provisional alternative recommended route to the initially set destination from the current position is determined.

At step S220, it is determined if the provisional alternative recommended route includes a route exiting a main road through an exit. If the provisional alternative recommended route includes the route exiting the main road through the exit, step S235 is executed. If not, the program 200 is ended.

At step S235, similarly to step S130, it is determined if the provisional alternative recommended route includes a merge point located on an upstream side of the exit identified at step S220 and is located within the predetermined distance β from the exit. If the determination result is YES (affirmative), step S240 is executed.

If not, the provisional alternative recommended route is defined as an alternative recommended route and then the program 200 is ended.

At step S240, similarly to step S135, it is determined if an entrance road, which is connected to the merge point, and an exit road, which is connected to the exit, are connected to the main road on a common side of the main road. If the both roads are connected to the common side of the main road, step S245 is executed. If not, the provisional alternative recommended route is defined as the alternative recommended route, and then the program 200 is ended.

At step S245, similarly to step S140, it is determined if the provisional alternative recommended route approaches the merge point along the main road. If the provisional alternative recommended route approaches the merge point along the main road, step S255 is executed. If not, the provisional alternative recommended route is defined as the alternative recommended route and then, the program 200 is ended.

At step S255, it is determined if the vehicle is driving through the main road on a lane, which the driver needs to change to the other lane so that the vehicle exits the main road through the exit identified at step S220 (i.e., it is determined if a current lane of the main road, on which the vehicle drives, is different from an exit lane that is directly connected to the exit identified at step S220). Here, the lane, which the driver needs to change, is a lane that does not contact a side of the main road, on which the exit road is located. For example, in the highway main road 41 shown in FIG. 1, the left lane of the highway main road 41 is the above-described lane, which the drive needs to change. When the vehicle drives on the lane, which the driver needs to change (i.e., when the current lane of the main road is different from an exit lane), step S260 is executed. If not, the provisional alternative recommended route is defined as the alternative recommended route, and then the program 200 is ended.

The identification of the lane, on which the vehicle drives, can be performed by contrasting the current position information received through a real time kinematics (RTK) GPS receiver with lane information included in the map data. Here, the RTK GPS receiver serves as the GPS receiver included in the position sensor 11, and can identify the current position with a tolerance of several centimeters. Also the current lane may be identified by alternative method. If the position of the vehicle has been identified with a tolerance of a width corresponding to the lane on a preceding drive route, on which the vehicle has driven (e.g., if the vehicle has passed through an electronic toll collection (ETC) gate, a position of which is included in the map data with the tolerance of the width of the lane), the current position of the vehicle can be identified with the tolerance of the width of the lane. Specifically, the current position of the vehicle can be identified by use of a self-contained navigation based on data detected by the speed sensor, the steering angle sensor, the magnetic field sensor and the gyroscope included in the position sensor 11. Then, the position detected by use of the self-contained navigation is compared with the lane information of the map data so that the current lane may be alternatively identified.

At step S260, the cost part of the link corresponding to a road that exits the main road through the exit (i.e., the link corresponding to the exit road) is increased to be larger by the positive number a than the normal cost part of the link (i.e., the cost part calculated at step S215 in the calculation of the provisional alternative recommended route).

At step S265, the alternative recommended route from the current position of the vehicle to the destination is determined by recalculating the cost of each of multiple possible routes based on the increased cost part for the link corresponding to the exit road. As a result, the route traveling along the exit road tends not to be selected as the alternative recommended route, because the cost of the route traveling along the exit road is increased by the positive number α compared with the cost previously calculated at step S215.

At step S270, similarly to step S220, it is determined if the alternative recommended route calculated at step S260 includes a route that exits the main road through the exit. If the recommended route includes the route exiting the main road through the exit, step S275 is executed. If not, the program 200 is ended.

At step S275, similarly to step S235, it is determined if the alternative recommended route includes the merge point, which is located on an upstream side of the exit identified at step S270, and which is located within the predetermined distance β from the exit. If the determination result of step S275 is YES, step S280 is executed. If the determination result is NO, the program 200 is ended.

At step S280, similarly to step S240, it is determined if the entrance road and the exit road are connected to the main road on the common side thereof. If the both entrance and exit roads are connected to the main road on the common side thereof, step S285 is executed. If not, the program 200 is ended.

At step S285, similarly to step S245, it is determined if the alternative recommended route approaches the merge point along the main road. If the alternative recommended route approaches the merge point along the main road, step S290 is executed. If not, the program 200 is ended.

At step S290, the merge warning is performed. Specifically, guidance data to be used in the above-described route navigation process is prepared beforehand. Warning for the risk of the collision with other vehicles coming along the entrance road will be outputted as text data or voice data to the visual display unit 13 or the speaker 14 based on the guidance data when the vehicle comes ahead of the merge point identified at step S270. The voice data go like "merge lane ahead, so watch out".

The CPU 19 executes the above-described program 200 so that the navigation system 1 calculates the provisional alternative recommended route to the destination the user sets (see step S215) when the vehicle deviates from the currently recommended route (see step S210). Then, the navigation system 1 determines (1) if the provisional alternative recommended route includes a route that exits the main road along the exit road (see step S220), (2) if the provisional alternative recommended route includes the entrance road that is merged into the main road at the merge point, which is located on the upstream side of the exit to the exit road, and which is located within the predetermined distance β from the exit (see step S235), (3) if the entrance road and the exit road are connected to the main road on the common side thereof (see step S240), (4) if the provisional alternative recommended route approaches the merge point along the main road (see step S245) and (5) if the current lane of the vehicle is different from the exit lane of the main road, which is directly connected to the exit road (see step S255). If all of the five determination results are YES, the cost part of the link corresponding to the exit road that exits the main road becomes the increased cost part corrected by adding the positive number a to the normal cost part (see step S260). Then, the total cost of each of the multiple possible routes to the destination is recalculated based on the increased cost part of the link so that the alternative recommended route is determined (see step S265).

In the road with multiple lanes as shown in FIG. 1, the vehicle may remain on the highway main road 41 without exiting the highway main road 41 along the exit road 43, in spite of the route navigation by the navigation system 1 that recommends that the current recommended route is the route 47, which exits the highway main road 41 along the exit road 43. In this case, if it is determined that the conditions (1) to (4) are satisfied in the above-described steps S220 to S245, the current lane of the vehicle is identified. If the current lane is the right lane in FIG. 1, the determination result in step S255 becomes NO (negative). If the drive lane is the left lane in FIG. 1, the determination result in step S255 becomes YES (affirmative). The increase amount of the cost of the route 46 due to exiting the highway main road 41 along the exit road 44 is increased to be larger in the case, where the determination result is YES, than the increase amount of the cost of the route 46 in the case, where the determination result is NO. As a result, the risk of the collision with another vehicle, which approaches the highway main road 41 along the entrance road 42, can be minutely taken into consideration based the current lane. Therefore, in FIG. 1, in some cases the navigation system 1 may select the route 48 instead of selecting the route 46 when the vehicle drives to the facility located on the downstream side of the road 45. Here, the route 48 remains on the highway main road 41 passing by the branch point 49 instead of exiting the highway main road 41. The route 46 travels along the exit road 44 to the road 45 through the branch point 49.

Even if one of the above-described conditions (1) to (5) is not satisfied, the cost part of the link corresponding to the exit road will not be increased and the alternative recommended route is not recalculated. Therefore, an increase amount of the total cost of the route X due to the case, where the route X travels along the main road and exits the main road along the exit road, is larger in a case, where the above-described conditions (1) to (5) are all satisfied than in the case, where the at least one of the conditions (1) to (5) is not satisfied. Even when the alternative recommended route satisfies all of the above-described conditions (1) to (5) (see steps S270 to S285), the merge warning guidance for the driver ahead of the entrance road will be prepared instead of the calculation of another alternative recommended route (see step S290).

Therefore, it is possible to draw attention of the driver by warning of the merger even in a case, where the route 46 that travels to the exit road 44 becomes the alternative recommended route after the above-described recalculation of the recommended route is performed.

Second Embodiment

A second embodiment of the present invention will be described below. The structure of a navigation system 1 for a vehicle according to the present embodiment is similar to that of the first embodiment except for a map data. Also, an operation of the navigation system 1 is similar to that according to the first embodiment except for a cost calculation method in a recommended route calculation process. The navigation system 1 in the present embodiment will be described focusing on mainly different parts from the navigation system 1 in the first embodiment.

Figure 5:
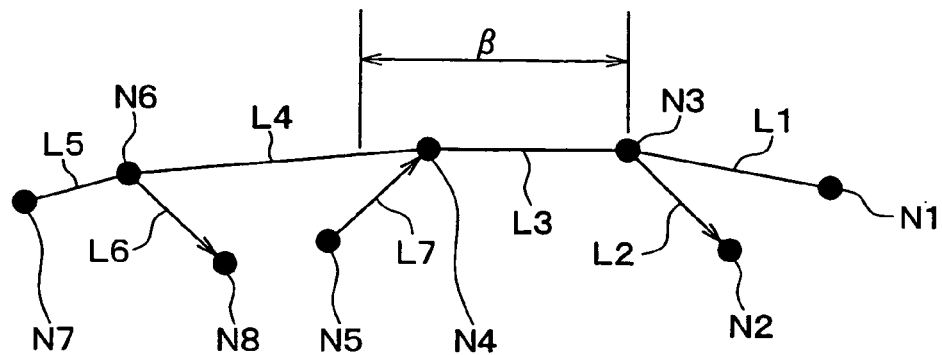
FIG. 5 is a diagram showing links and nodes in map data that correspond to the road configuration shown in FIG. 1.
Figure 6:
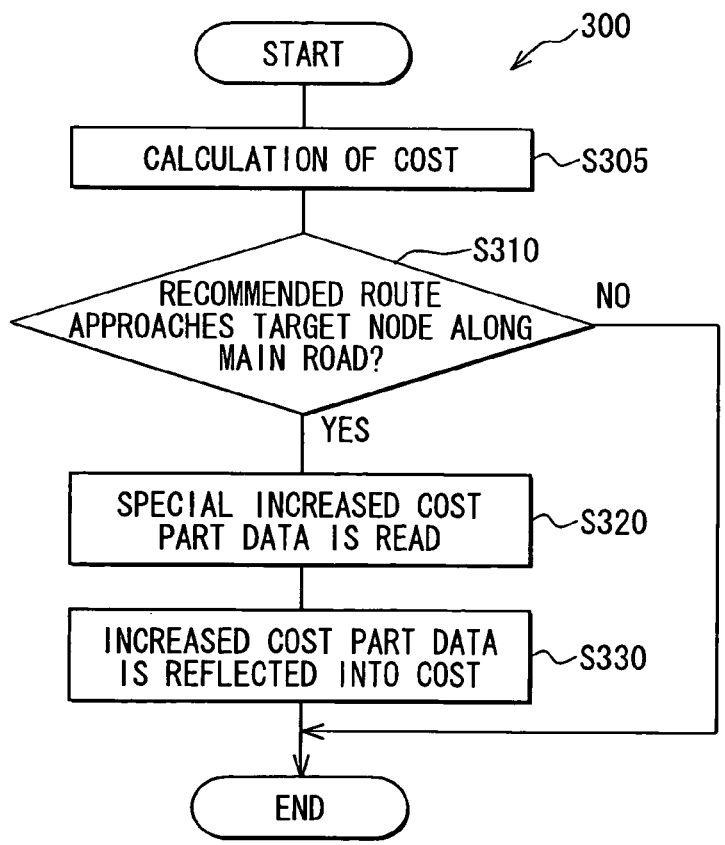
FIG. 6 is a flow chart of a program, which is executed by the CPU.

The map data included in the navigation system 1 in the present embodiment includes a special increased cost part data table in addition to the map data in the first embodiment. The special increased cost part data table includes multiple entries, each of which associates a specific link on the map with a corresponding special increased cost part. Here, the specific link is a link that corresponds to the exit road in the road configuration, where the exit road branches from the multi-lane road at the branch point on a common side of the multi-lane road, where the entrance road is merged into the multi-lane road on the common side thereof on the upstream side of the multi-lane road. For instance, in FIG. 1, a link of the exit road 44 is referred as the specific link. FIG. 5 shows a structure of links L1 to L7 and nodes N1 to N8 included in the map data correspondingly to the road configuration shown in FIG. 1. The links L1, L3, L4 and L5 correspond to a link of the highway main road 41, and the link L7 corresponds to a link of the entrance road 42. The link L2 corresponds to the link of the exit road 44. The node N4 corresponds to a node of the merge point 50, and the node N3 corresponds to a node of the branch point 49. Therefore, the specific link is the link L2. It is noted that the special increased cost part data include multiple positive values, each of which indicates the increase amount of the cost part of a specific route, the increase amount due to the exit road located on the specific route for exiting the road.

The CPU 19 in the present embodiment executes the programs 100 and 200 in the first embodiment. However, the CPU 19 executes the program 100 from step S150 skipping steps S110 to S145. Also, the CPU 19 executes the program 200 from step S265 by skipping steps S210 to S260. In the calculation of the recommended route at steps S150 and S265, similarly to the first embodiment, costs of multiple possible routes for the recommended route are calculated and one of the possible routes with the smallest cost is defined as the recommended value in the recommended route calculation process 20. In the first embodiment, a cost part of each link that constitutes the corresponding possible route is calculated. However, in the present embodiment, a cost part of the specific link, which has a corresponding cost part in the special increased cost part data table, is calculated by the execution of a program 300. In other words, the CPU 19 calculates an initial cost part of the specific link based on a distance between nodes, which are located on both ends of the specific link and the like at step S305. Then, at step S310, it is determined if the possible route travels toward a preceding node (the node N4 in FIG. 5) of a target link, which is a target for cost part calculation, through a main road (the link L4 in FIG. 5). If the possible route travels toward the preceding note through the main road, step S320 is executed. If not, the program 300 is ended.

At step S320, the special increased cost part data for the specific link is read from the special increased cost part data table. Then at step S330, the read special increased cost part data is added to the initial cost of the possible route calculated at step S305, and the program 300 is ended.

The CPU 19 executes the above-described program 300 so that the navigation system 1 determines if the possible route for the recommended route travels along the main road to enter a target route that includes the specific link (see step S310). If the determination result is YES, the cost part for the specific link is increased (see step S330) based on the corresponding special increased cost part data (see step S320). In the road configuration, where the exit road branches from the multi-lane road at the branch point on the common side of the multi-lane road, where the entranced road is merged into the multi-lane road on the upstream side of the branch point on the common side of the multi-lane road, an increase amount of cost of a route (A) due to the exiting of the multi-lane road along the exit road is calculated to be larger than the increase amount of the cost of a route (B) by use of the navigation system 1. As a result, the risk of the collision with other vehicles that drive into the multi-lane road along the entrance road can be taken into consideration in the determination of the recommended route. Here, the multi-lane road includes the multiple lanes. The route (A) travels through the multi-lane road to merge with the entrance road, and then the route (A) exits the multi-lane road along the exit road. The route (B) travels through the entrance road to merge with the multi-lane road, and then the route (B) exits the multi-lane road along the exit road. Therefore, in the above-described road configuration, the possible route, which travels along the multi-lane road to merge with the entrance road and then exits the multi-lane road along the exit road, has less possibility to be selected as the recommended route compared with the conventional system.

An alternative method for determining specific links that are included in the special increased cost part data table at a time of generating the special increased cost part data table of the map data will be described below. Firstly, the map data, which don't include the special increased cost part data table, is generated, and then a general-purpose computer reads the map data such that the general-purpose computer identifies the specific links. Here, the specific link is a link that corresponds to the exit road, which branches from a multi-lane road at a branch point on a common side of the multi-lane road, where an entrance road is connected to the multi-lane road at a merge point located on the common side of the multi-lane road within a certain distance (e.g., a predetermined distance $\beta$) from the branch point. Then, each of the identified specific links is associated with a predetermined positive number $\alpha$ such that the special increased cost part data table is made based on the association between the identified specific links and the corresponding predetermined positive numbers.

In the above-described first and second embodiments, the CPU 19 executes steps S110 to S180 of the program 100 and steps S210 to S285 of the program 200 to serve as route calculating means. Also, the CPU 19 executes the route navigation process 21 to serve as route guiding means. The CPU 19 executes steps S120, S130, S140 to serve as upstream side section determining means and executes step S135 to serve as connection side determining means. The CPU 19 executes step S145 to serve as profile value increase setting means and executes step S185 to serve as merge warning means.

The CPU 19 executes steps S220, S235 and S245 of the program 200 to serve as the upstream side section determining means and executes step S240 to serve as the connection side determining means. The CPU 19 executes step S255 to serve as drive lane detecting means and executes step S260 to serve as the profile value increase setting means. The CPU 19 executes step S290 to serve as the merge warning means.

The CPU 19 executes step S310 of the program 300 to serve as the upstream side section determining means and executes step S320 and S330 to serve as the profile value increase setting means.

Alternatives of the embodiments will be described.

In the above-described embodiments, when the vehicle deviates from the recommended route, an alternative recommended route will be calculated as described in the program 200. However, the invention may not be so limited. For example, when the recommended route is firstly calculated, the CPU 19 may calculate some assumed cases, where the vehicle might deviate from the recommended route at multiple points. Then, the CPU 19 may calculate an alternative recommended route that travels from each of the multiple points to the destination. Further, the CPU 19 may calculate some assumed cases, where the vehicle might drive on each of multiple lanes the road corresponding to a route of the case the vehicle deviates from the recommended route. Therefore, the calculation in the case, where all of the determination results in steps S220 to S255 in the program 200 are YES (affirmative), is performed in advance such that the alternative recommended routes based on the increased cost part for the exit road can be calculated in advance.

Also, in the above-described embodiment, the navigation system 1 for the vehicle is described as one example of the navigation system according to the present invention. However, the navigation system according to the present invention is not limited to the navigation system for the vehicle, but can be applied to a mobile navigation system that a person can carry.

Figure 7:
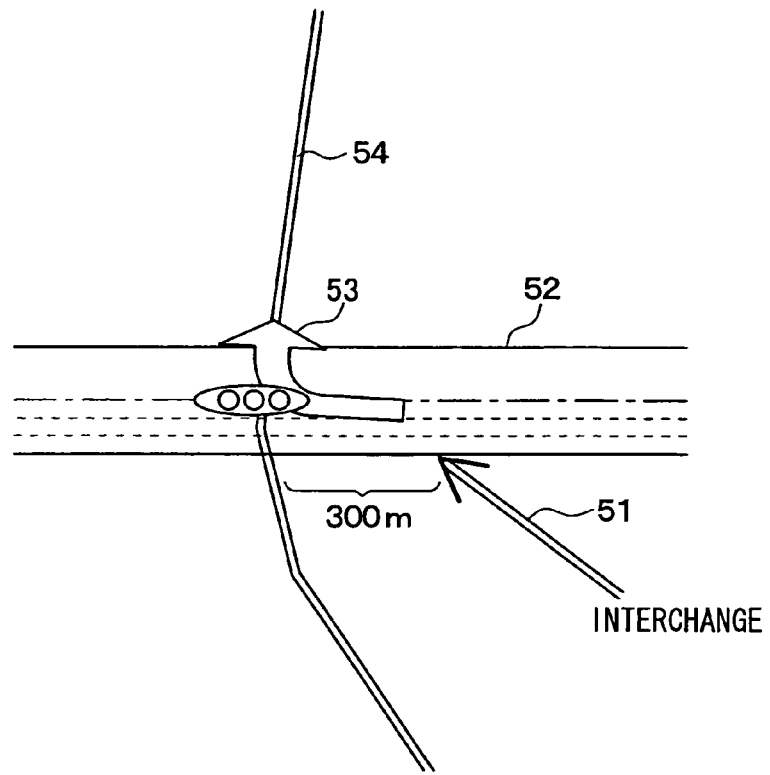
FIG. 7 is a road map showing a particular state, where a vehicle needs to change traffic lanes immediately after the vehicle enters a multiple-lane road.

The merge altering process in the above embodiments may be applied to a state shown in FIG. 7. In FIG. 7, an exit ramp (exit road) 51 from a highway is connected to an open multi-lane road 52, which has three lanes on each side, at a connection point. At a point located 300 m away toward left in FIG. 7 from the connection point, there is an intersection between the open road 52 and a road 54, which is perpendicular to the open road 52. If the navigation system 1 calculates a recommended route, which travels along the exit road 51 to enter the open road 52 and turns right as shown by an arrow 53 to enter the road 54, the driver has to change lanes in a very short distance. In the above-described case, the navigation system 1 may detect that the vehicle needs to change lanes within a short distance after entering the multi-lane road with multiple lanes on each side, when the recommended route is calculated. Therefore, the navigation system 1 may warn that the vehicle is approaching to a difficult junction, where it is difficult to change lanes, before the vehicle reaches the difficult junction. As a result, the driver is limited from being confused by a possible sudden navigation that recommends a difficult lane change.

Third Embodiment

Figure 8:
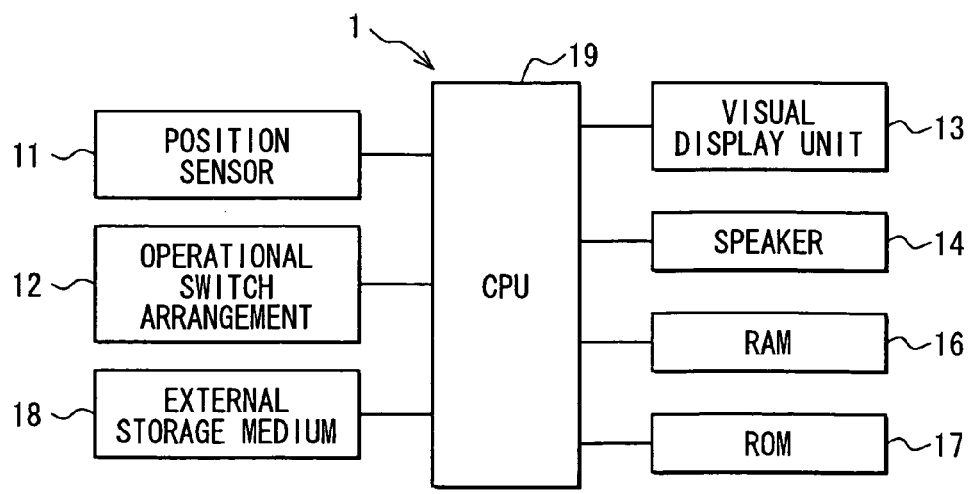
FIG. 8 is a hardware structure diagram of a navigation system according to a third embodiment of the present invention.

A third embodiment of the present invention will be described below. The third embodiment of the present invention will be described with reference to the accompanying drawings. Similar components of a navigation system of the present embodiment, which are similar to the components of the navigation system of the first embodiment, will be indicated by the same numerals. FIG. 8 is a hardware structure diagram of a navigation system 1 according to the third embodiment of the present invention.

The navigation system 1 in the third embodiment is similar to the navigation system 1 in the above-described embodiments except for a map data and programs that the CPU 19 executes. Therefore, different points from the above-described embodiments will be mainly described.

The map data include facility data and road data, which have positions and types of links and nodes, lane information, connection relationship between the links and the nodes. The lane information includes a number of lanes in a corresponding link, a width of each lane, a position of each lane and a connection relationship of each lane with other links. Connection ability of each lane to each link is determined in advance based on a lane regulation state by legislation, which is indicated by road paints such as "right turn only", "left turn only" and "strait ahead only", and a lane regulation state by physical objects, such as a medial strip.

Figure 9:
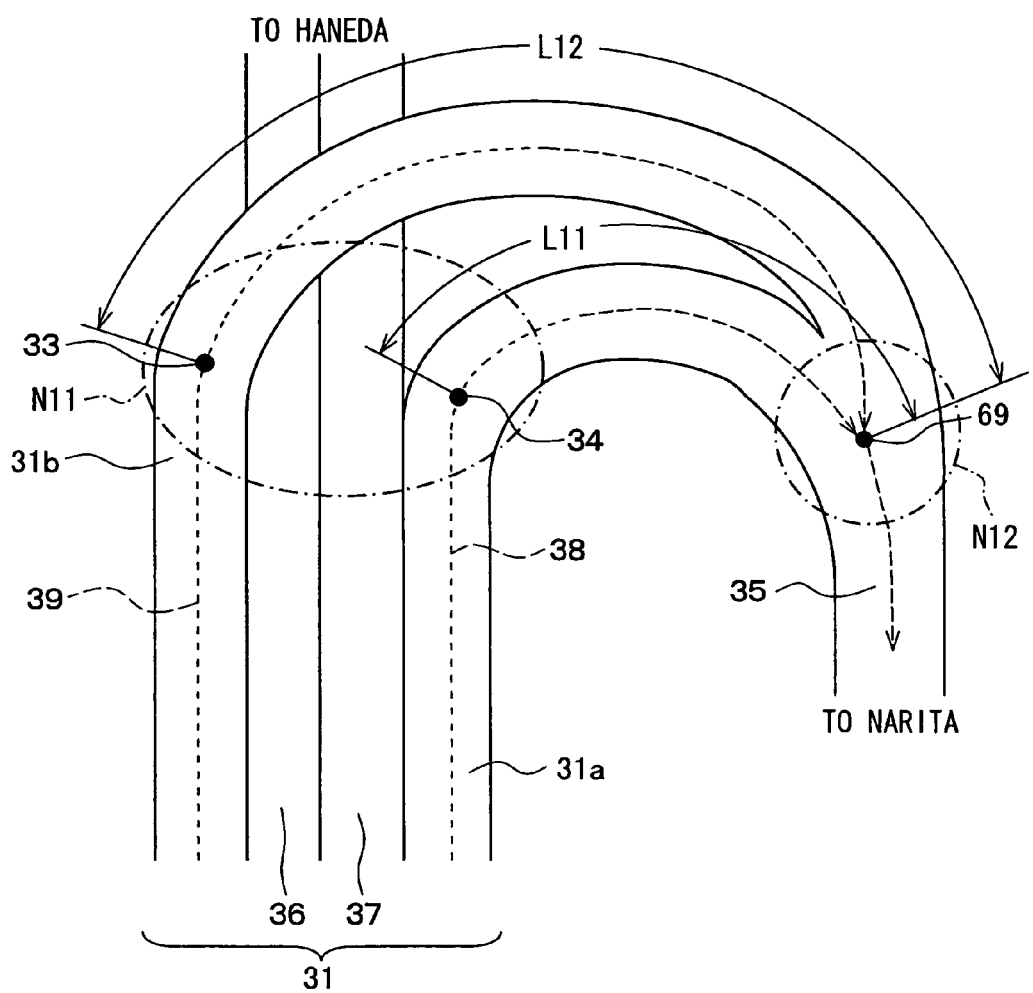
FIG. 9 is a schematic map of exit ramps (exit roads) of a highway road around a navigation point according to the third embodiment of the present invention.
Figure 12:
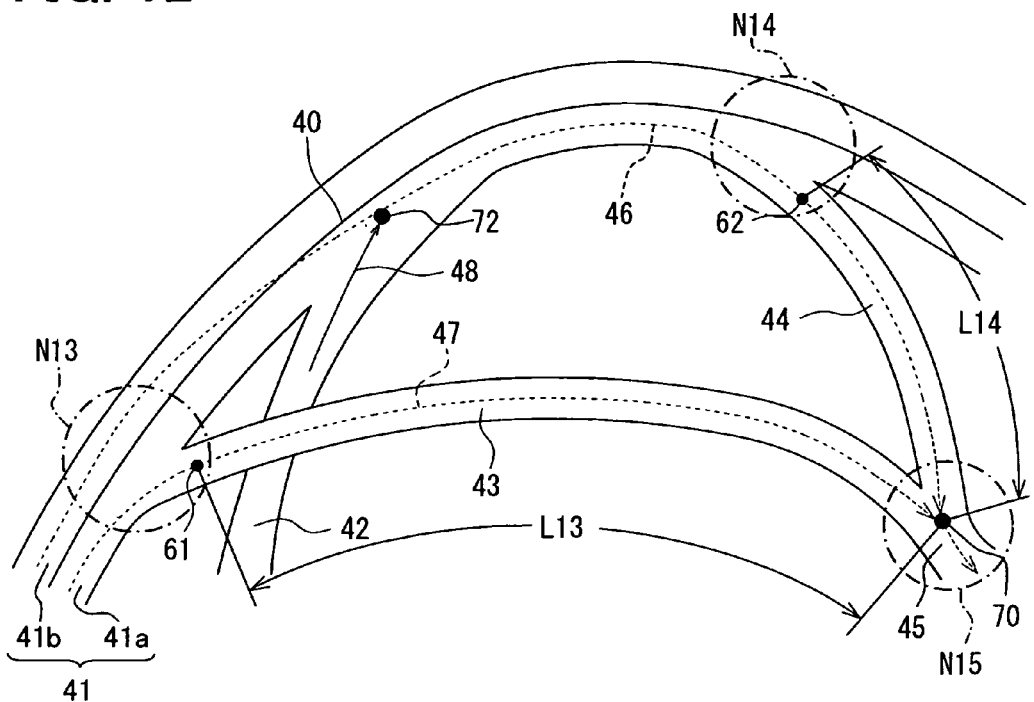
FIG. 12 is a schematic map of entrance and exit ramps (entrance and exit roads) of a highway road around a navigation point according to the third embodiment of the present invention.

Also, locations (latitude and longitude) of first branch points of temporal branch link pairs are stored in the map data. Also, spots, each of which is located on an upstream side of the corresponding temporal branch link pair, serve as initial navigation starting spots (first guide spots) and are stored in the map data. The temporal branching link pair means a link pair (two links) that satisfies one of a first feature and a second feature. In the first feature, both links L11, L12 of the link pair branch from the one node N11, and both links L11, L12 are inevitably merged together at a node N12 as shown in FIG. 9. In the second feature, two nodes N13, 14 are closely arranged along a link. An upstream end of the first link L13 of the two links is connected with a first node N13 of the two nodes. An upstream end of the second link L14 of the two links is connected with a second node N14 of the two nodes. The, a downstream end of the first link L13 and a downstream end of the second link L14 merge together at a node N15 as shown in FIG. 12. Here, the first node N13 is located within a reference distance (e.g., 500 m) from the second node N14. Also, in another example of the second feature, the two nodes may be regarded as conceptually being located in a close vicinity to each other with in the junction area by a generator of the map data, when inherent road conditions of the nodes are taken into consideration.

FIG. 9 is a schematic map showing a road configuration that includes the temporal branch link pair N11, L12. In the road configuration, a lane 31b, which is located on a left end of a four-lane road 31 and goes upward from a bottom in FIG. 9, branches from the other lanes at a branch point 33. Similarly, a lane 31a, which is located on a right end of the four-lane road 31 and goes upward from the bottom, branches from the other lanes at a branch point 34. Then, both lanes 31a and 31b are inevitably merged together at a merge point 69 to connect with a road 35, which is bound for Narita located at a bottom-right direction in FIG. 9. Also, two center lanes 36 and 37 of the four-lane road 31 are bound for Haneda, which is located in top direction in FIG. 9. In FIG. 9, a link L12 between the branch point 33 and the merge point 69 and another link L11 between the branch point 34 and the merge point 69 correspond to the temporal branch link pair.

The first branch point in the temporal branch link pair is a branch point, which a vehicle firstly encounters when the vehicle drives along a link connected to the temporal branch link pair. In FIG. 9, the first branch point in the temporal branch link pair may be one of the branch points 33 and 34.

The spot (e.g., a first spot) located on the upstream side the temporal branch link pair stored in the map data indicates a spot, which is located on a drive link connected to the link pair, and which is located on the upstream side of both the branch points (nodes) connected to the link pair. Here, the drive link means a link, on which the vehicle drives. A location of the spot is determined by the generator of the map data, who consider the traffic conditions. Typically, the spot is located on the drive link about 1 km ahead of the first branch point of the temporal branch link pair.

Specifically, the CPU 19 performs the current position identifying process, the recommended route detecting process and the route navigation process by executing the programs.

The current position identifying process determines the current position and direction of the vehicle based on the signals from the position sensor 11 by use of the well-known technology, such as the map mapping.

In the recommended route detecting process, the CPU 19 receives input signal of the destination by the user through the operational switch arrangement 12, and calculates a most suitable recommended route (first recommended route) from the present location to the destination.

In the route navigation process, the CPU 19 reads the map data from the external storage medium 18 and superimposes calculated data on the map, which is indicated by the map data. Here, the superimposed calculated data include the recommended route, the target facility, the facilities on the way to the target facility and the current position of the vehicle. Then, in the route navigation process the CPU 19 outputs the map image, which is superimposed with the calculate data, to the visual display unit 13. When it comes to the particular state, such as when the vehicle reaches the position that is located on an upstream side of the navigation point (intersection) within the predetermined distance from the navigation point, the guidance voice signal for instruction, such as right turn, left turn or lane change, is outputted through the speaker 14. Specifically, the navigation system 1 navigates the right and left turn at a point located on an upstream side of a non-navigation point within the predetermined distance from the non-navigation point, which will be described later. Also, the navigation system 1 navigates the right and left turn and the lane change at the spot located on a upstream side of a navigation point within the predetermined distance from the navigation point. Here, the navigation point includes an intersection on the recommended route.

Figure 10:
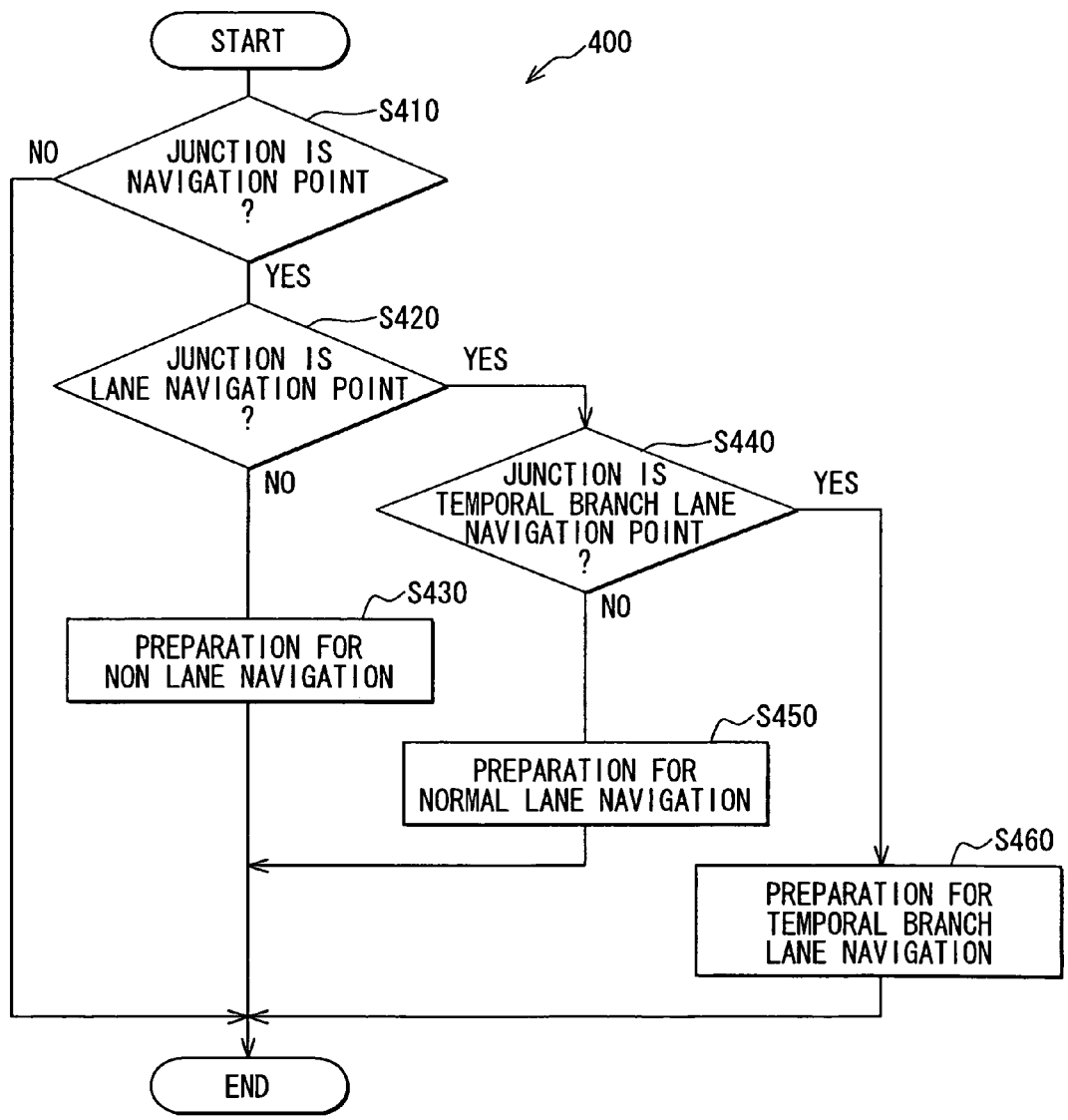
FIG. 10 is a flow chart of a program for a navigation preparation, which is executed by the CPU.
Figure 11:
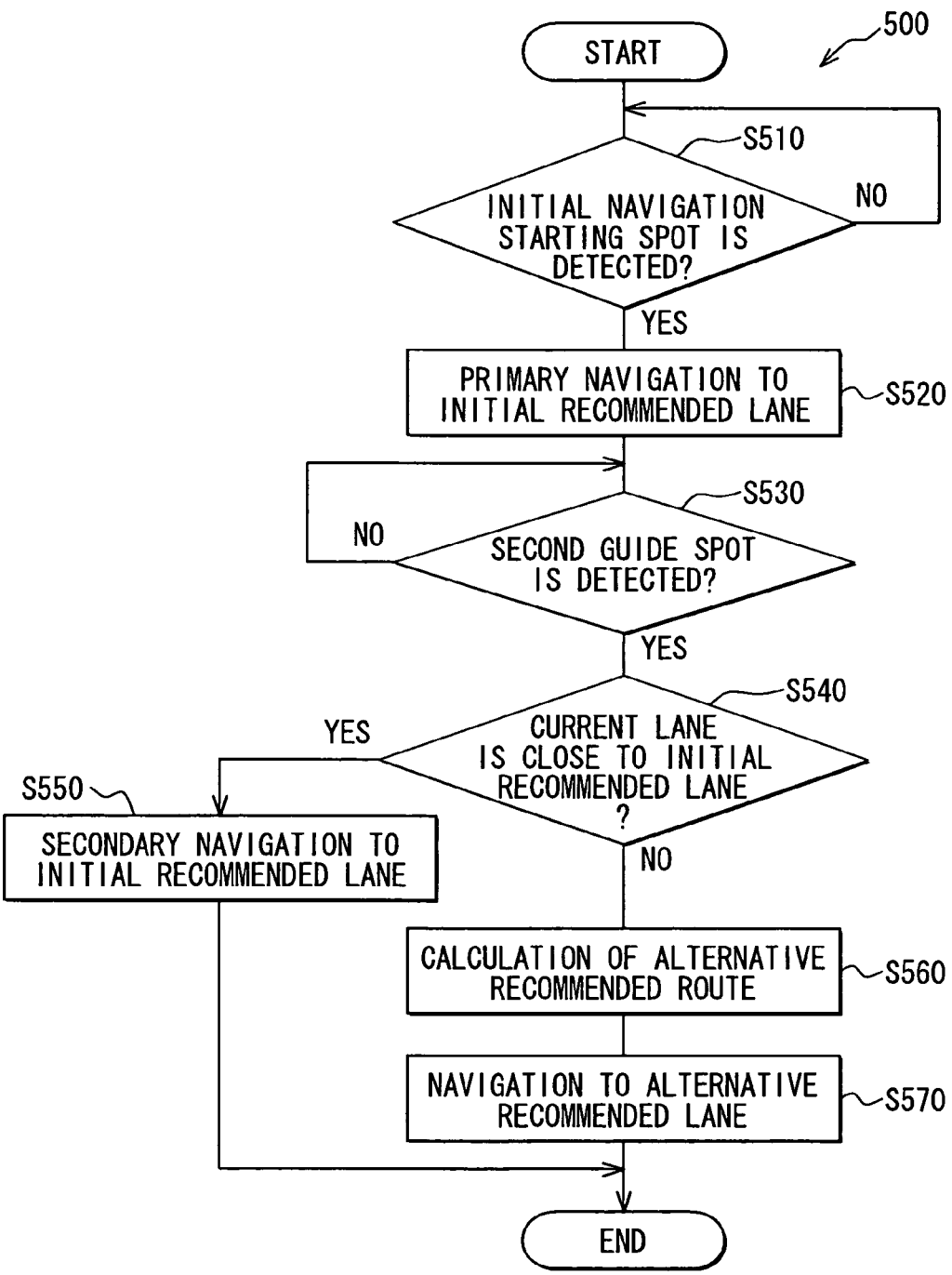
FIG. 11 is a flow chart of a program for a temporal branch lane navigation, which is executed by the CPU.

In the present embodiment, the CPU 19 executes a program 400 for a navigation preparation shown in FIG. 10 at every intersection on an initial recommended route (first recommended route), or when the initial recommended route is calculated in the recommended route detecting process. Here, the intersection includes a branch point and a merge point. The CPU 19 also repeatedly executes a program 500 for the temporal branch lane navigation, as a part of the route navigation process.

In an execution of the program 400 for the navigation preparation toward an intersection, firstly at step S410, the CPU 19 identifies the intersection as the navigation point when the initial recommended route does not cross the intersection strait along a road. The CPU 19 identifies so also when the initial recommended route turns right or left at the intersection, and when the initial recommended route approaches the intersection along a major road and exits the intersection through a minor road. If the intersection is determined as the navigation point (junction area), step S420 is executed. If not, the program 400 is ended.

At step S420, it is determined if the intersection is a lane navigation point based on the map data. Specifically, the intersection is determined as the lane navigation point if an approaching road, which approaches the intersection along the initial recommended route, has multiple lanes going in the same direction in the driving direction. If the intersection is determined as the lane navigation point, step S440 is executed. If not, step S430 is executed.

At step S440, it is determined if the intersection is the temporal branch lane navigation point based on the map data (multi-branch point determining means). The intersection is determined as the temporal branch lane navigation point if a temporal branch road branches from the initial recommended route at the intersection or branches from the multi-lane road at a point located on a downstream side of the intersection with a reference distance from the intersection and then the temporal branch road inevitably merges with the initial recommended route. Specifically, the intersection is determined as the temporal branch lane navigation point when one of the following three conditions is satisfied. In the first condition, a first definition of the first branch point of the temporal branch link pair, which is stored in the map data, is applied to the intersection. In the first definition, upstream ends of both links of the link pair branch from the one node and downstream ends of both links are inevitably merged together (downstream ends of both links are inevitably connected with another node on the initial recommended route). In the second condition, a second definition of the first branch point of the temporal branch link pair, which is stored in the map data, is applied to the intersection. In the second definition, two nodes are closely arranged along a link, and an upstream end of the first link of the two links is connected with a first node of the two nodes, and upstream end of the second link of the two links is connected with a second node of the two nodes, and a downstream end of the first link and a downstream end of the second link merge together (a downstream end of the first link and a downstream end of the second link are connected with another node on the initial recommended route). If the intersection is determined as the temporal branch lane navigation point, step S460 is executed. If not, step S450 is executed.

At step S430, the intersection is determined as a non-lane navigation point (i.e., as a navigation point that is not the lane navigation point), and a non lane navigation is prepared. Specifically, the preparation for the non lane navigation means that CPU 19 stores data, which indicates that the intersection is the non lane navigation point, in the RAM 16. After step S430, the present execution of the program 400 is ended.

At step S450, the intersection is determined as a normal lane navigation point (i.e., as a navigation point that is the lane navigation point but not the temporal branch lane navigation point), and a normal lane navigation is prepared. Specifically, the preparation for the normal lane navigation means that CPU 19 stores data, which indicates that the intersection is the normal lane navigation point, in the RAM 16. After step S450, the present execution of the program 400 is ended.

At step S460, the intersection is determined as the temporal branch lane navigation point and a temporal branch lane navigation is prepared. Specifically, the preparation for the temporal branch lane navigation means that CPU 19 stores data, which indicates that the intersection is the temporal branch lane navigation point, in the RAM 16. After step S460, the present execution of the program 400 is ended.

The CPU 19 executes the program 400 so that the navigation system 1 classifies a type of each of the intersections on the initial recommended route as one of the three points, which include the non lane navigation point, the normal lane navigation point, and the temporal branch lane navigation point (see steps S410, S420 and S440). If the intersection is classified as the non lane navigation point, the navigation system 1 prepares for the non lane navigation (see step S430). If the intersection is classified as the normal lane navigation point, the navigation system 1 prepares for the normal lane navigation (see step S450). If the intersection is classified as the temporal branch lane navigation, the navigation system 1 prepares for the temporal branch lane navigation (see step S460).

While the vehicle drives, the CPU 19 executes a program 500 for the temporal branch lane navigation to determine if the current position of the vehicle identified by the current position identifying process is the initial navigation starting spot (first guide spot) described in the map data (at step S510). If the current position is the initial navigation starting spot, step S520 is executed. If not, step S510 is repeatedly executed. At step S520, a primary lane navigation (i.e. the vehicle is guided to a lane based on the initial recommended route is performed (first recommended route lane navigating means). Here, the temporal branch lane navigation point is a target for the navigation, and is a navigation point, which is one of a closest navigation point from the initial navigation starting spot stored in RAM 16 in step S460 of the program 400, and which is located on a downstream side of the initial navigation starting spot. Specifically, the lane navigation is performed such that firstly a recommended lane (first recommended route lane) is identified based on the lane information in the map data and then the recommended lane is displayed in the visual display unit 13 and outputted through the speaker 14. The recommended lane is a lane, which is one of the lanes on the approaching road and is able to exit the temporal branch lane navigation point. For example, if the initial recommended route turns right, the recommended lane is a lane, which is accessible to a link located after the right turn and is included in the approaching road (e.g., the right end lane or one of the two right end lanes). In the lane navigation of this case, messages are outputted through the speaker 14. The messages go like "turn right ahead, so change the lane to the right end lane," and "turn left ahead, so change the lane to one of the two left end lanes." In the lane navigation, an expanded map, which emphasizes the recommended lane, is displayed in the visual display unit 13.

Then, at step S530, it is determined if the current position of the vehicle is a second guide spot and step S530 is repeated until it is so determined. In other words, the CPU 19 stands by until the vehicle reaches the second guide spot. The second guide spot is located between the initial navigation starting spot and the temporal branch lane navigation point, and is closer to the temporal branch lane navigation point. A distance between the second guide spot to the temporal branch lane navigation point may be similar to a distance between the non lane navigation point and a guide spot thereof. The distance between the second guide spot to the temporal branch lane navigation point may be similar to a distance between the normal lane navigation point and a guide spot thereof. For example, the second guide spot may be located within a predetermined distance (e.g., 500 m) frontward of the temporal branch lane navigation point along the initial recommended route.

If the current position of the vehicle is determined as the second guide spot (i.e., when the vehicle reaches at the second guide spot) at step S530, it is determined if a current drive lane (i.e., a lane, on which the vehicle is currently driving) is close to the recommended lane at step S540. The recommended lane is the lane, on which the driver is instructed to drive the vehicle by the visual display unit 13 and the speaker 14 at step S520. Here, when the drive lane is close to the recommended lane, specifically the current drive lane is closer to the recommended lane than to an alternative recommended lane (second recommended route lane). Here, the alternative recommended lane is a recommended lane, which is a target for the lane navigation of the temporal branch lane navigation point along an alternative recommended route (second recommended route) when the alternative recommended route will be calculated at step S560 as described later. More specifically, the alternative recommended lane is accessible to a link, which is one of the temporal branch link pair of the temporal branch lane navigation point stored as the map data and is different from the link that is on the initial recommended route. Therefore, the alternative recommended lane can be identified based on the map data.

The identification of the current drive lane, on which the vehicle drives, can be performed by contrasting the current position information received through the RTK GPS receiver with the lane information included in the map data. Here, the RTK GPS receiver serves as the GPS receiver included in the position sensor 11, and can identify the current position with a tolerance of several centimeters. Also the current lane may be identified by alternative method. If the location of the vehicle has been identified with a tolerance of a width of the lane on a preceding driving route of the vehicle (e.g., if the vehicle has passed through an electronic toll collection (ETC) gate, a location of which is included in the map data with the tolerance of the width of the lane), the current position of the vehicle can be identified with the tolerance of the width of the lane. Specifically, the current position of the vehicle can be identified by use of a self-contained navigation based on data detected by the speed sensor, the steering angle sensor, the magnetic field sensor and the gyroscope included in the position sensor 11. Then, the location detected by use of the self-contained navigation is compared with the lane information of the map data so that the current lane may be alternatively identified.

If it is determined that the current drive lane is located close to the recommended lane at step S540, and step S550 is executed. If it is determined that the current drive lane is not close to the recommended lane (i.e., the current drive lane is closer to the alternative recommended lane than to the recommended lane.), step S560 is executed.

At step S550, a second lane navigation is performed. Specifically, the lane navigation at step S550 coincides with that at step S520. When step S550 is finished, the current execution of the program 500 for the temporal branch lane navigation is ended.

At step S560, the alternative recommended route is calculated. The alternative recommended route is a preferable route between a start point (i.e., the current position of the vehicle) and the destination of the initial recommended route and the preferable route travels along one of the temporal branch link pair of the temporal branch lane navigation point. Here, the one of the temporal branch link pair is not on the initial recommended route. The alternative recommended route is inevitably merged into the initial recommended route at the point, where both of the temporal branch link pair are merged together. Here, the alternative recommended route may be calculated at the time of the execution of step S460 for the temporal branch lane navigation point in the program 400 shown in FIG. 10 and may be stored in the RAM 16. Then, at step S570, the alternative recommended route may be read from the RAM 16.

Then at step S570, the lane navigation based on the alternative recommended route is performed (second recommended route lane navigating means). In other words, visual and voice instruction for the change to the alternative recommended lane will be performed by use of the visual display unit 13 and the speaker 14. When step S570 is finished, the current execution of the program 500 for the temporal branch lane navigation is ended.

The CPU 19 executes the program 500 so that when the vehicle is identified to reach the initial navigation starting spot (see step S510), the navigation system 1 for the vehicle performs the lane navigation for the temporal branch lane navigation point along the initial recommended route (see step S520). Then, when the lane navigation is ended and the vehicle is identified to reach the second guide spot, which is located frontward of the temporal branch lane navigation point (see step S530), it is determined if the vehicle is close to the initial recommended lane (see step S540). If the vehicle is determined to be close to the initial recommended lane, the lane navigation based on the initial recommended route is repeated (see step S550). If the vehicle is not determined to be close to the initial recommended lane, the alternative recommended route (second recommended route), which travels on the temporal branch route, is calculated (see step S560) and the lane navigation based on the calculated alternative recommended route is performed (see step S570).

Here, an example will be described with reference to a case, where the vehicle, which includes the above-described navigation system 1 for the vehicle, drives on an initial recommended route 38 depicted by a dashed line in the road configuration shown in FIG. 9. In this case, when the vehicle with the navigation system 1 reaches the initial navigation starting spot (first guide spot) located on an upstream side of the branch points 33 and 34, the voice and visual navigation by step S520 of the program 500 for the temporal branch lane navigation is performed. A message of "turn right ahead, so change the lane to the right end lane" serves as the voice navigation, and the expanded lane is displayed for the visual navigation. Then, when the vehicle reaches the second guide spot, the current drive lane is identified. If the identified current drive lane is either the recommended lane 31*a* or the lane 37, which is closer to the recommended lane 31*a* than to an alternative recommended lane 31*b*, the voice navigation and the visual navigation are performed at step S550. Here, the voice navigation goes like "turn right ahead, so change the lane to the right end lane," and the visual navigation is performed by displaying the expanded lane. In contrast, if the identified current drive lane is either the alternative recommended lane 31*b* or the lane 36, which is closer to the alternative recommended lane 31*b* than to the recommended lane 31*a*, the alternative recommended route 39 is calculated at step S560 and the voice navigation and the visual navigation are performed. Here, the voice navigation goes like "turn right ahead, so change the lane to the left end lane."

FIG. 12 shows another road configuration with a temporal branch link pair. In the road configuration in FIG. 12 at a merge point 72, an entrance road 42 is merged into a highway main road (multi-lane road) 41 with two lanes going from bottom left to the right in FIG. 12. A branch point 61 located on an upstream side of the merge point 72 between the entrance road 42 and the highway main road 41, an exit road 43 branches from the highway main road 41. Also, at a branch point 62 located on the downstream side of the merge point 72, an exit road 44 branches from the highway main road 41. Here, the exit road 44 and the exit road 43 are inevitably merged together to connect to a road 45 at a merge point 70. In this case, a link L13, which provides connection between the branch point 61 and the merge point 70, and a link L14, which provides connection between the branch point 62 and the merge point 70, correspond to the above-described temporal branch link pair. Also, in an example shown in FIG. 12, the first branch point of the temporal branch link pair corresponds to the branch point 61.

Here, an example will be described with reference to a case, where the vehicle with the navigation system 1 drives on an initial recommended route 47 depicted by the dashed line in the road configuration shown in FIG. 12. Here, the initial recommended route 47 includes less merge points than another route 46 depicted by the dashed line does, due to the entrance road 42 in a junction area between the branch points 61, 62. Likewise, in the recommended route search process (route computing means) of the CPU 19 of the navigation system 1, a cost (a profile value) of a route with less merge points is calculated to be less such that the route with less merge points is preferentially selected as the initial recommended route. Therefore, the vehicle can drive on a safer route because the route with less merge points is selectively defined as a recommended route.

In this case, when the vehicle reaches the initial navigation starting spot located on an upstream side of the branch point 61, step S520 of the program 500 for the temporal branch lane navigation is executed so that the navigation system 1 performs the visual guidance with the expanded lane display and the voice guidance of "turn right ahead, so change the lane to the right lane." Then, when the vehicle reaches the second guide spot, the current drive lane is identified. If the identified current drive lane is the right lane 41*a* of the highway main road 41, step S550 is executed such that the CPU 19 performs the voice guidance of "turn right ahead, so keep the current lane," and the CPU 19 also displays the visual guidance with the expanded lane. If the identified lane is the left lane 41*b* of the highway main road 41, an alternative recommended route 46 is calculated at step S560. At step S570, the navigation system 1 performs the visual guidance with the expanded lane indication and the voice guidance of "go straight along the current road and turn right X meters ahead, so temporally stay on the current lane and then change the lane to the right lane."

As discussed above, the navigation system 1 firstly guides the recommended lane based on the initial recommended route. However, when the vehicle does not drive on the recommended lane based on the initial recommended route, the navigation system 1 guides the other recommended lane based on the alternative recommended route leading to the temporal branch road, which is inevitably merged into the initial recommended route. Therefore, when it is difficult for the vehicle to change lanes accordingly to the initial recommended route, the driver may have less tendency to try to change lanes based on the initial recommended route in some cases. Further, the vehicle may be easily recovered to drive on the initial recommended route.

Here, in the third embodiment, the CPU 19 executes step S520 of the program 500 for the temporal branch lane navigation to serve as first recommended route lane navigating means. The CPU 19 executes step S540 of the program 500 to serve as lane determining means. Also, the CPU 19 executes step S570 of the program 500 to serve as second recommended route lane navigating means. Further, the CPU 19 executes step S440 of the program 400 for navigation preparation to serve as multi-branch point determining means.

Figure 13:
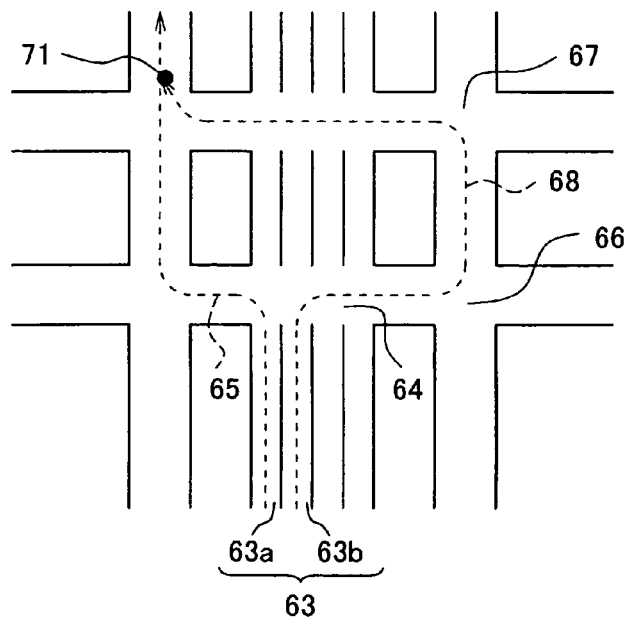
FIG. 13 is a schematic map showing roads perpendicularly crossing each other.

Alternative embodiments of the third embodiment will be described. In the above-described embodiment, the CPU 19 executes the program 500 at the navigation point, which corresponds to the temporal branch lane navigation point. Here, at the temporal branch lane navigation point, the temporal branch road branches from the initial recommended route and thereafter inevitably merges with the initial recommended route. Also the temporal branch road branches from the initial recommended route at a point located on a downstream side of the temporal branch lane navigation point within the reference distance therefrom. Thereafter, the temporal branch road inevitably merges with the initial recommended route. However, the navigation point may not be so limited. For example, the CPU 19 may alternatively execute the program 500 at a navigation point, which corresponds to a lane navigation point 64 at roads with a rectangular arrangement shown in FIG. 13. Here, a multi-lane road 63 with two lanes on each side approaches the lane navigation point 64. A left lane 63*a* of the two upward lanes of the approaching road 63 is assumed to be a left-turn-or-straight only lane. A right lane 63*b* of the two upward lanes is assumed to be a right turn only lane. Also the initial recommended route 65 travels like a dashed line shown in FIG. 13.

In this case, the CPU 19 of the navigation system 1 operates as follows. When the vehicle reaches a point located on an upstream side of the lane navigation point 64 within a reference distance therefrom, the CPU 19 determines that the vehicle reaches the initial navigation starting spot (step S510 of the program 500). Then, at step S520, the CPU 19 performs the visual guidance with an expanded lane display and the voice guidance, which goes like "turn left ahead, so change the lane to the left lane." Thereafter, if the vehicle is determined to reach the second guide spot for the lane navigation point 64 at step S530, the current drive lane of the vehicle is identified at step S540. If the identified lane is the left lane 63*a*, the CPU 19 performs the visual guidance with the expanded lane display and the voice guidance, which goes like "turn left ahead, so stay on the current lane." If the identified lane is the right lane 63*b*, an alternative recommended route 68 is calculated at step S560. Here, the alternative recommended route 68 turns right to branch from the initial recommended route 65 and travels through intersections 66 and 67 such that the alternative recommended route 68 merges with the initial recommended route 65 at a merge point 71. Thereafter, at step S570, the CPU 19 performs the visual guidance with the expanded lane display and the voice guidance, which goes like "turn right ahead, so stay on the current lane."

Also, in the third embodiment, the initial navigation starting spots are stored in the map data such that the generator of the map data can take road conditions at every temporal branch lane navigation point into consideration. Therefore, profiles of the initial navigation starting spots are adjusted. However, the initial navigation starting spots are not so limited. Even when the data of the initial navigation starting spots is not included in the map data, the CPU 19 may alternatively determine that the vehicle has reached the initial navigation starting spot at step S510. Here, at the alternative step S510, the CPU 19 may determine that the vehicle has reached the initial navigation starting spot if the vehicle reaches a point, which is located on an upstream side of the temporal branch lane navigation point within a reference distance therefrom, and is located along the initial recommended route. The reference distance may be preferably larger than a distance between the non lane navigation point and a guide spot thereof than a distance between the normal lane navigation point and a guide spot thereof.

Also, in the third embodiment, the navigation system 1 for the vehicle is described as one example of the navigation system of the present invention. However, the navigation system according to the present invention is not limited to the navigation system for the vehicle, but can be applied to a mobile navigation system that a person can carry.

Additional advantages and modifications will readily occur to those skilled in the art. The invention in its broader terms is therefore not limited to the specific details, representative apparatus, and illustrative examples shown and described.

What is claimed is:

1. A navigation system for a vehicle, comprising:
   multi-branch point determining means for determining whether a navigation point of a multi-lane road along a first recommended route to a destination is a temporal branch lane navigation point depending on whether a temporal branch road branches from the first recommended route at the navigation point or branches from the multi-lane road at a point located on a downstream side of the navigation point with a reference distance from the navigation point, the temporal branch road inevitably merging with the first recommended route;
   first recommended route lane navigating means for guiding the vehicle to a first recommended route lane of the multi-lane road based on the first recommended route at a first spot located along the multi-lane road on an upstream side of the navigation point when the multi-branch point determining means determines that the navigation point is the temporal branch lane navigation point;
   lane determining means for determining whether a current lane, on which the vehicle drives, is the first recommended route lane at a second spot located along the multi-lane road between the first spot and the navigation point; and
   second recommended route lane navigating means for guiding the vehicle to a second recommended route lane of the multi-lane road based on a second recommended route to the destination when the lane determining means determines that the current lane is not the first recommended route lane, wherein
   the second recommended route travels along the multi-lane road and exits the multi-lane road along the temporal branch road.

2. The navigation system according to claim 1, wherein:
   when the lane determining means determines that the current lane is not the first recommended route lane of the multi-lane road, the lane determining means determines whether the current lane is the second recommended route lane or closer to the second recommended route lane than to the first recommended route lane; and
   when the lane determining means determines that the current lane is the second recommended route lane or closer to the second recommended route lane than to the first recommended route lane, the second recommended route lane navigating means guides the vehicle to the second recommended route lane based on the second recommended route to the destination.

3. The navigation system according to claim 2,
   the first recommended route used by the first recommended route lane navigating means has less merge points.

4. A program embodied in a computer readable medium, the program includes:
   a multi-branch point determining code segment that determines whether a navigation point of a multi-lane road along a first recommended route to a destination is a temporal branch lane navigation point depending on whether a temporal branch road branches from the first recommended route at the navigation point or branches from the multi-lane road at a point located on a downstream side of the navigation point with a reference distance from the navigation point, the temporal branch road inevitably merging with the first recommended route;
   a first recommended route lane navigating code segment that guides a vehicle to a first recommended route lane of the multi-lane road based on the first recommended route to a destination at a first spot located along the multi-lane road on an upstream side of the navigation point when the multi-branch point code segment determines that the navigation point is the temporal branch lane navigation point;
   a lane determining code segment that determines whether a current lane, on which the vehicle drives, is the first recommended route lane at a second spot located along the multi-lane road between the first spot and the navigation point; and
   a second recommended route lane navigating code segment that guides the vehicle to a second recommended route lane of the multi-lane road based on a second recommended route to the destination when the lane determining code segment determines that the current lane is not on the first recommended route lane, wherein:
   the second recommended route travels along the multi-lane road and exits the multi-lane road along the temporal branch road a second branch road.

5. A method, used in a vehicle navigation system, for navigating a vehicle, comprising:
   determining whether a navigation point of a multi-lane road along a first recommended route to a destination is a temporal branch lane navigation point depending on whether a temporal branch road branches from the first recommended route at the navigation point or branches from the multi-lane road at a point located on a downstream side of the navigation point with a reference distance from the navigation point, the temporal branch road inevitably merging with the first recommended route;

guiding the vehicle to a first recommended route lane of the multi-lane road based on the first recommended route to a destination at a first spot located along the multi-lane road on an upstream side of the navigation point when it is determined that the navigation point is the temporal branch lane navigation point;

determining whether a current lane, on which the vehicle drives, is the first recommended route lane at a second spot located along the multi-lane road between the first spot and the navigation point; and guiding the vehicle to a second recommended route lane of the multi-lane road based on a second recommended route to the destination when it is determined that the current lane is not the first recommended route lane in the determining of whether the current lane is the first recommended route lane, wherein the second recommended route travels along the multi-lane road and exits the multi-lane road along the temporal branch road.

* * * * *